(12) United States Patent
Holliday et al.

(10) Patent No.: US 11,850,669 B2
(45) Date of Patent: Dec. 26, 2023

(54) SLOT MILLING SEQUENCE

(71) Applicant: KYOCERA SGS PRECISION TOOLS, INC., Munroe Falls, OH (US)

(72) Inventors: Ian Edward Holliday, Basingstoke (GB); Emil Dobosz, Wokingham (GB); Barry Leslie Ward, Wokingham (GB); Antony James Theaker, Leeds (GB); David Cawkwell, Sheffield (GB)

(73) Assignee: KYOCERA SGS PRECISION TOOLS, INC., Munroe Falls, OH (US)

(*) Notice: Subject to any disclaimer, the term of this patent is extended or adjusted under 35 U.S.C. 154(b) by 0 days.

(21) Appl. No.: 17/862,652

(22) Filed: Jul. 12, 2022

(65) Prior Publication Data

US 2022/0355395 A1  Nov. 10, 2022

Related U.S. Application Data

(63) Continuation of application No. 15/733,049, filed as application No. PCT/US2018/057733 on Oct. 26, 2018, now Pat. No. 11,396,053.
(Continued)

(51) Int. Cl.
*B23C 3/28* (2006.01)
*B23C 5/10* (2006.01)

(52) U.S. Cl.
CPC .......... *B23C 3/28* (2013.01); *B23C 5/10* (2013.01); *B23C 2210/084* (2013.01); *B23C 2220/366* (2013.01)

(58) Field of Classification Search
CPC ........... B23C 3/12; B23C 3/122; B23C 3/124; B23C 3/126; B23C 3/16; B23C 3/18;
(Continued)

(56) References Cited

U.S. PATENT DOCUMENTS 5,908,269 A   6/1999  Cox
5,931,616 A   8/1999  Daub
(Continued)

FOREIGN PATENT DOCUMENTS

EP   1 967 307 A1   9/2008
JP   2010158762 A   7/2010

OTHER PUBLICATIONS

International Search Report and Written Opinion for Application No. PCT/US2018/057733 International File Date Oct. 26, 2018. Kyocera SGS Precision Tools, Inc. Applicant, dated Jan. 4, 2019. Authorized Officer Lee W. Young. 10 pages. Forms PCT/ISA/220, 210 and 237.

(Continued)

*Primary Examiner* — Nicole N Ramos
(74) *Attorney, Agent, or Firm* — Vorys, Sater, Seymour and Pease LLP; Mark A. Watkins

(57) ABSTRACT

A slot milling sequence includes a plurality of material removal processes or operations. Each of the material removal operations includes utilization of an end mill tool. Some of the material removal operations utilize trochoidal tool paths, whereas other material removal processes utilize one or more profile cuts. Some material removal operations that utilize profile cuts remove material from both sides of the cut in a single pass, whereas other material removal operations remove material from one side of the cut via a first pass of the end mill tool and remove material from the opposing side of the cut via a second pass of the end mill tool.

19 Claims, 18 Drawing Sheets

Related U.S. Application Data

(60) Provisional application No. 62/580,160, filed on Nov. 1, 2017.

(58) Field of Classification Search
CPC .. B23C 3/28; B23C 3/30; B23C 3/305; B23C 3/34; B23C 5/12; B23C 5/14; B23C 5/10; B23C 2220/36; B23C 2220/363; B23C 2220/366; B23C 2220/605; B23C 2210/084
See application file for complete search history.

(56) References Cited

U.S. PATENT DOCUMENTS

| | | | | |
|---|---|---|---|---|
| 6,077,002 | A | 6/2000 | Lowe | |
| 6,164,877 | A * | 12/2000 | Kamata | B23C 5/10 407/62 |
| 7,007,382 | B2 * | 3/2006 | Mantel | B24B 19/02 29/889 |
| 7,862,263 | B2 * | 1/2011 | van Iperen | B23C 5/10 407/54 |
| 8,142,119 | B2 * | 3/2012 | Volokh | B23C 3/02 407/53 |
| 8,511,949 | B2 * | 8/2013 | Itoh | B23C 3/34 407/53 |
| 8,567,059 | B2 * | 10/2013 | Jette | B23C 3/36 451/48 |
| 8,807,881 | B2 | 8/2014 | Itoh et al. | |
| 8,973,264 | B2 | 3/2015 | Barnat et al. | |
| 9,539,655 | B2 * | 1/2017 | Barnat | B23C 3/30 |
| 9,623,492 | B2 | 4/2017 | Capriotti et al. | |
| 10,722,954 | B2 * | 7/2020 | Borowicz | B23C 3/16 |
| 2005/0015983 | A1 | 1/2005 | Mantel | |
| 2010/0178119 | A1 | 7/2010 | Volokh et al. | |
| 2011/0129311 | A1 | 6/2011 | Itoh | |
| 2011/0179646 | A1 | 7/2011 | Barnat | |
| 2011/0182685 | A1 * | 7/2011 | Barnat | B23P 13/02 29/889 |
| 2013/0149063 | A1 | 6/2013 | Charlesworth | |
| 2017/0216938 | A1 * | 8/2017 | Tsuduki | B23C 3/34 |

OTHER PUBLICATIONS

Supplementary European Search Report dated Jul. 26, 2021, by European Patent Office for Application No. 18871856.3; EPO form 1507S; 8 pages.

* cited by examiner

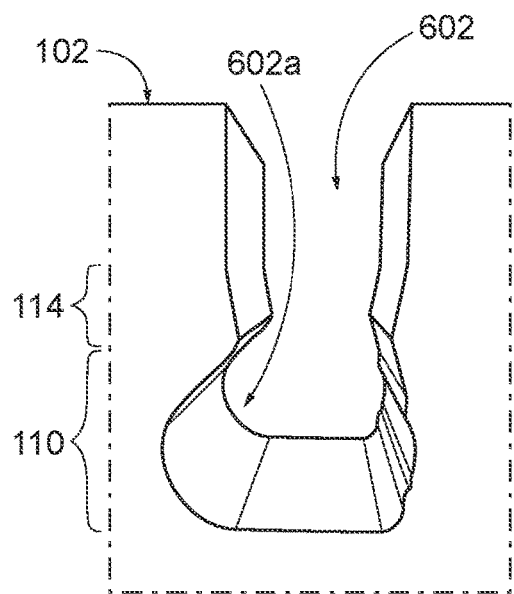 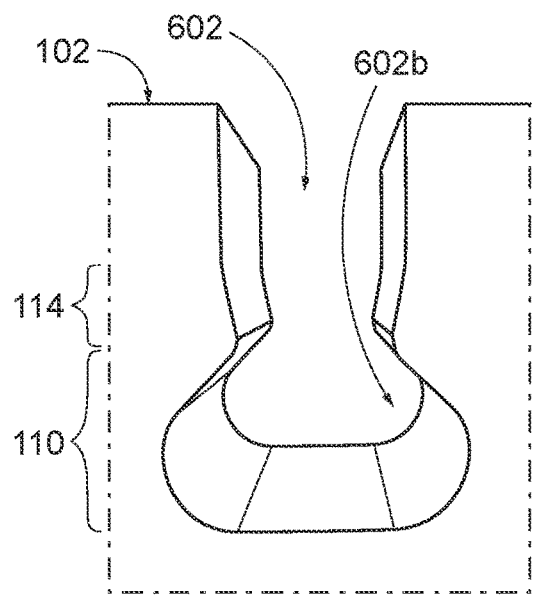
FIG. 6A　　　　　　　　　　FIG. 6B
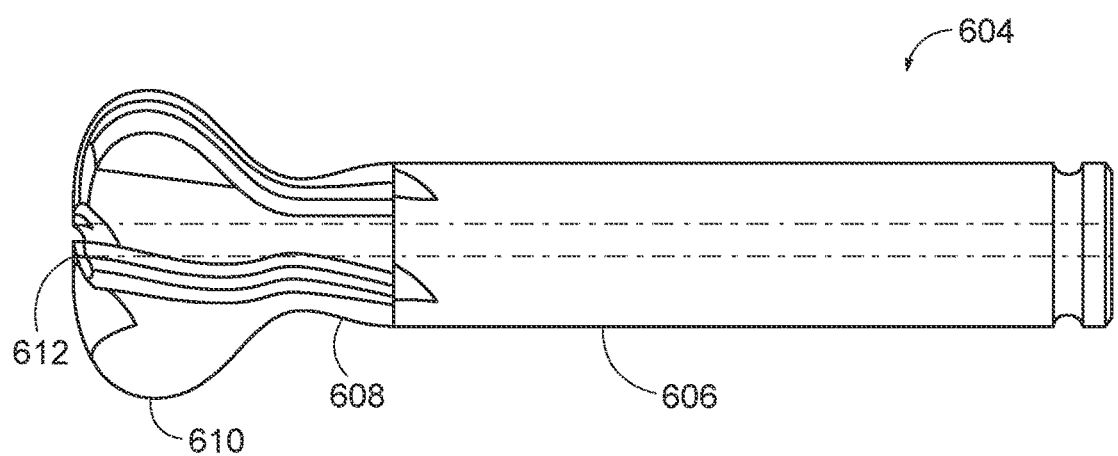
FIG. 6C

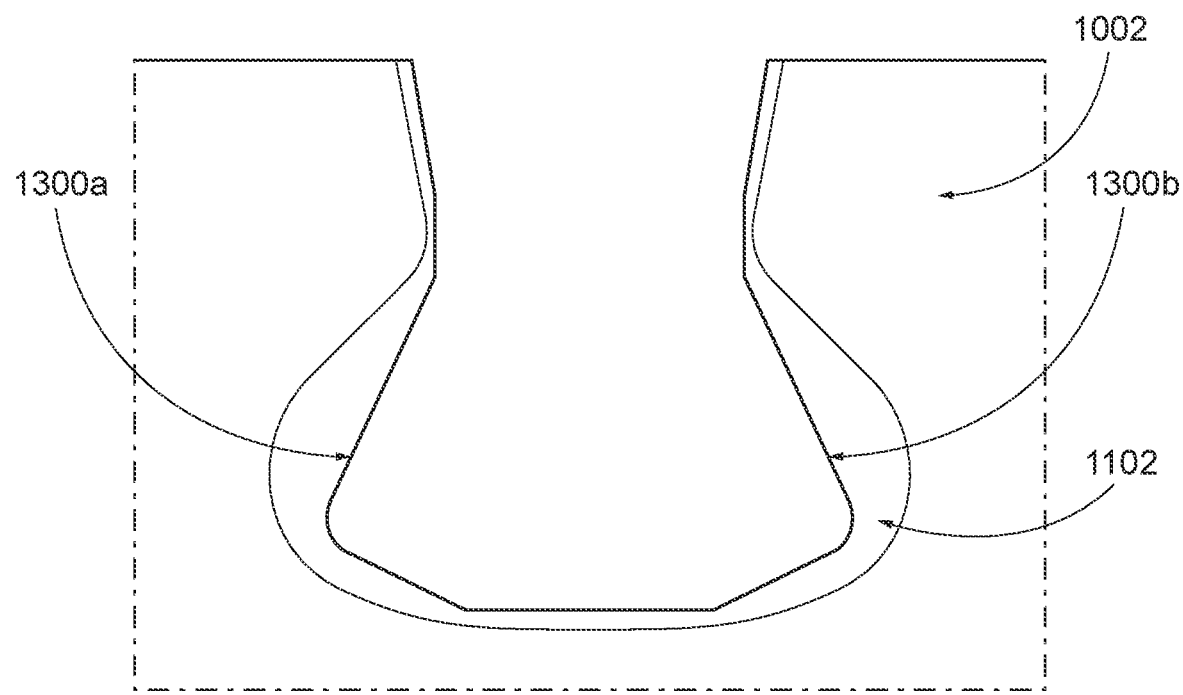
FIG. 13A
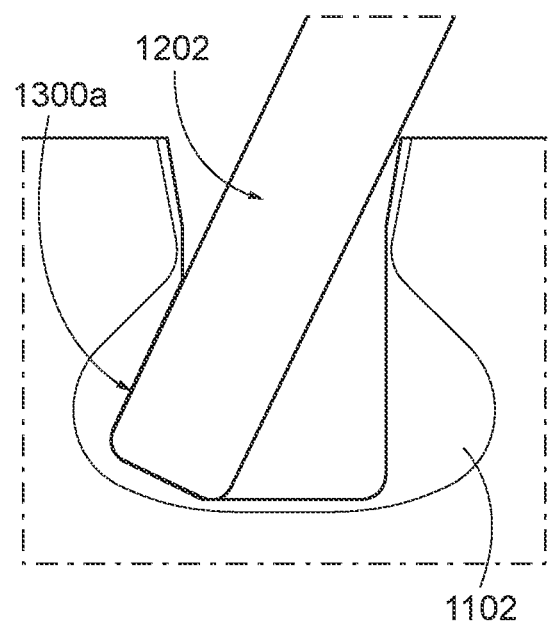 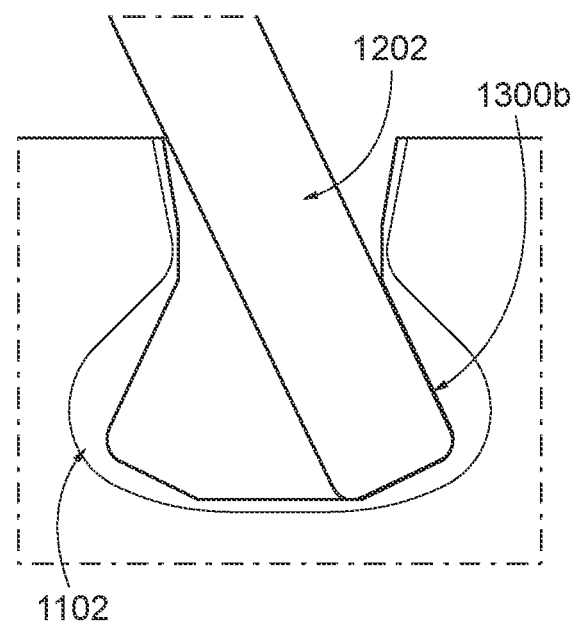
FIG. 13B  FIG. 13C

SLOT MILLING SEQUENCE

CROSS-REFERENCE TO RELATED APPLICATIONS

This Patent Application is a continuation of U.S. patent application Ser. No. 15/733,049 filed Apr. 30, 2020, which claims priority to and the benefit of International Patent Application No. PCT/US2018/057733 having an International filing date of Oct. 26, 2018, and U.S. Provisional Patent Application Ser. No. 62/580,160 filed on Nov. 1, 2017, which are incorporated by reference herein in their entirety.

BACKGROUND

Milling is the process of machining flat, curved, or irregular surfaces by feeding a work piece against a rotating cutter that contains a number of cutting edges. Milling machines are generally characterized as either vertical or horizontal, and include a motor-driven spindle that receives and rotates the milling cutter. These machines are utilized to perform a number of material-removal processes, including forming a slot in a work piece.

Slots may be milled into a work piece via a variety of methods and, often times, a particular method is selected based on the parameters of a particular application. In some applications, slots are milled via a side and face milling procedure. This procedure is often utilized to efficiently form long and/or deep slots, and may be arranged as a "gang" to machine more than one surface in the same plane at the same time. However, end milling procedures may be utilized to form slots that are curved, angled, and/or wider than the tool diameter.

Various types of cutting tools or cutters may be utilized to form a slot. For example, tapered and/or untapered end mills may be utilized to roughen at least a portion of the slot and then the wider diameter portion near the bottom of the slot may be roughened with one or more bulbed end mills. Further, the slot may be finished or semi-finished with one or more bulbed end mills. Conventional slot milling procedures, however, are inefficient and lead to increased wear and tear on the cutters and machines. This presents a challenge in machining operations since worn-out tools damage the work piece and need to be replaced, but may only be replaced when the machine is turned off, thereby increasing down time and adding inefficiency to the machining process.

SUMMARY

Embodiments disclosed herein are directed towards various methods of forming slots and tools utilized in the various operations of such methods.

In one embodiment, a method of machining a bulb slot in a disc is disclosed. Here, the method includes roughing a slot in the disc, roughing upper angle portions in the slot, roughing lower angle portions in the slot, roughing a bulb form in the upper angle portions and the lower angle portions of the slot, semi-finishing the bulb form, and finishing the bulb form to form the bulb slot. In this method, the step of roughing a slot in the disc may be performed via a first rougher tool that is fed through the disc along a trochoidal tool path. Also in this method, the step of roughing upper angle portions in the slot may be performed via a first rougher tool that is fed through the disc along a first and second tool path, wherein a first of the upper angle portions may be formed via the first tool path and a second of the upper angle portions may be formed via the second tool path; and, in such embodiments, the first rougher tool may be tilted in a first orientation for the first tool path and the first rougher tool may be tilted in a second orientation for the second tool path. In other embodiments, the step of roughing lower angle portions in the slot may be performed via a first rougher tool that is fed through the disc along a first and second tool path, wherein a first of the lower angle portions is formed via the first tool path and a second of the lower angle portions is formed via the second tool path; and, in such embodiments, the first rougher tool may be tilted in a first orientation for the first tool path and the first rougher tool may be tilted in a second orientation for the second tool path.

In some embodiments, the step of roughing upper angle portions in the slot is performed via a first rougher tool that is fed through the disc along a first and second tool path, wherein a first of the upper angle portions is formed via the first tool path where the first rougher tool is tilted in a first orientation and a second of the upper angle portions is formed via the second tool path where the first rougher tool is tilted in a second orientation; and the step of roughing lower angle portions in the slot is performed via the first rougher tool that is fed through the disc along a third and fourth tool path, wherein a first of the lower angle portions is formed via the third tool path where the first rougher tool is tilted in a third orientation and a second of the lower angle portions is formed via the fourth tool path where the first rougher tool is tilted in a fourth orientation. In these embodiments, the step of roughing a slot in the disc is performed via the first rougher tool.

In some embodiments, the step of finishing the bulb form to form the bulb slot is performed via a finishing tool. The finishing tool may include a plurality of flutes helically extending along a cutting portion, each of the flutes defining a cutting edge and a plurality of teeth arranged on a cutting face of the finishing tool, each of the teeth extending from one of cutting edges, at least one of the plurality of teeth extending over a centerline of the cutting face. Here, a remaining set of the plurality of teeth do not extend over the centerline of the cutting face. In some of these embodiments, each of the remaining set of the plurality of teeth are spaced at equal distances from a center point of the cutting face; whereas, in other embodiments, at least two of the remaining set of the plurality of teeth are spaced at unequal distances from a center point of the cutting face. In some embodiments, the finishing tool includes a central channel that extends through the finishing tool and opens at least one side hole provided on at least one of the flutes. The finishing channel may be incorporated into a shank portion of the finishing tool to direct coolant or other fluids down the flutes space to the cutting zone. In some of these embodiments, the finishing tool includes a coating such as a physical vapor deposition coating.

In some embodiments, the step of semi-finishing the bulb form is performed via a semi-finishing tool, and the semi-finishing tool is converted from the finishing tool by removing the at least one of the plurality of teeth that extends over the centerline of the cutting face. In some of these embodiments, the semi-finishing tool includes a plurality of cutting edges that helically extend about a cutting portion of the semi-finishing tool and each extend into one of the plurality of teeth on the cutting face, the cutting portion defining a diameter that is smaller than the finishing tool. In some of these embodiments, the semi-finishing tool includes a central channel that extends through the semi-finishing tool and opens at a hole provided on the cutting face. In some of these embodiments, each of the cutting edges includes a variable edge hone. In some of these embodiments, the semi-finishing tool includes a physical vapor deposition coating.

In some embodiments, the step of roughing the bulb form in the upper angle portions and the lower angle portions of the slot is performed via a form rougher tool, and the form rougher tool is converted from the semi-finishing tool by reducing a diameter of the semi-finishing tool. In some of these embodiments, a plurality of chip breaker notches are provided into the cutting edges. In some of these embodiments, the form rougher tool includes a physical vapor deposition coating.

In another embodiment, a method of cutting a slot for a disc is disclosed where the slot having a groove portion that is formed in an outer surface of the disc and extends in a groove depth direction into a bulb portion so that the slot has a bulb shape beneath the outer surface of the disc, the slot is bilaterally symmetrical with respect to a center of the groove portion and the bulb portion, the groove portion includes a tapered portion that narrows as it extends in the groove depth into the bulb portion. Here, the method includes: a first operation in which a first roughening is performed via a first tool having a tapered shape with a diameter that narrows along the groove depth direction, the first tool cutting in parallel with the groove depth direction down from the outer surface towards a portion that will become a beginning of the bulb portion and leaving a first allowance; a second operation in which a second roughening is performed via a second tool, the second tool cutting in parallel with the groove depth direction down from the outer surface towards a portion that will become an end of the bulb portion and leaving a second allowance; a third operation in which a third roughening is performed via a third tool, the third tool having a bulbed cutting portion, the third tool cutting at least a portion of the second allowance in parallel with the groove depth direction down from the tapered portion towards the portion that will become the end of the bulb portion and leaving a third allowance; a fourth operation in which a semi-finishing is performed via a fourth tool, the fourth tool cutting in parallel with the groove depth and cutting the first, second, and third allowances, and leaving a fourth allowance; and a fifth operation in which a finishing is performed via a fifth tool, the fifth tool cutting in parallel with the groove depth direction and cutting the first, second, third, and fourth allowances.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 6A and 6B are representations of the bulb slot roughening operation (Op3) according to the principles of the present disclosure.

FIG. 6C is a side view of a bulb cutting tool utilized in the bulb slot roughening operation (Op3) according to one or more embodiments of the present disclosure.

FIGS. 13A-13C illustrate the lower angle portions formed via a third operation of the milling sequence of FIG. 9 when forming of the slot of FIG. 10.

DETAILED DESCRIPTION

The present disclosure is related to a milling sequence and, more particularly, to a milling sequence that may be used to form a slot in a work piece.

The embodiments described herein provide a method of cutting a slot in a work piece such as a round disc that may be utilized, for example, to mount a turbine blade on an outer circumference of a rotor.

The embodiments described herein provide milling sequences that utilize a plurality of different end mills and tools, with each end mill being utilized in a discrete material removal operation or process. Other embodiments described herein provide milling sequences that utilize different end mills and thus help reduce wear and tear and otherwise improve milling efficiency.

Figures 1A, 1B:
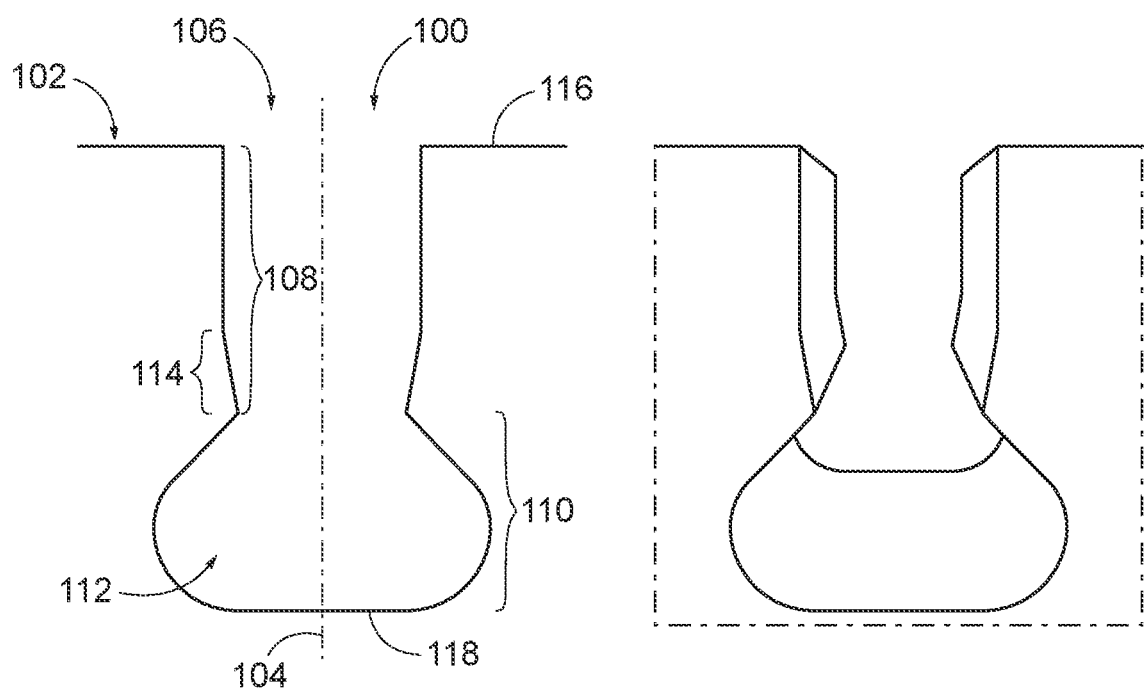
FIG. 1A is a side isometric side view of a slot that is machined according to the principles of the present disclosure.
FIG. 1B is a front isometric view of a slot that is machined according to the principles of the present disclosure.
Figure 1C:
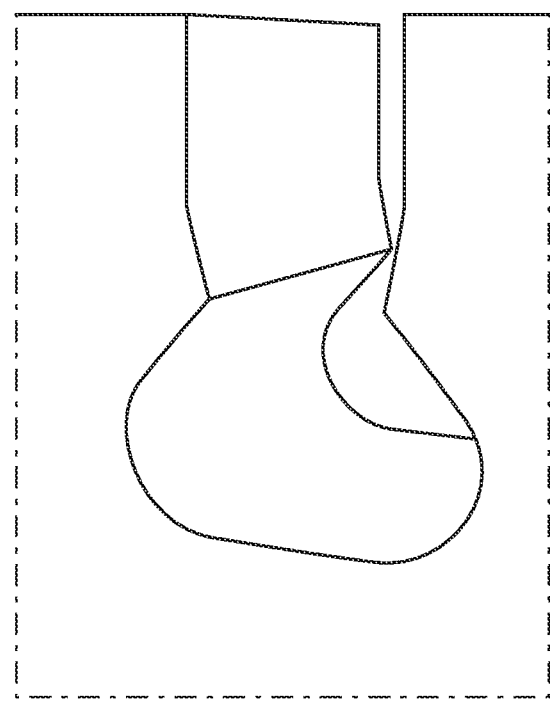
FIG. 1C is a detailed front view of an exemplary slot that is machined according to one or more embodiments of the present disclosure.

FIGS. 1A-1C illustrate a slot 100 (sometimes referred to as the finished slot 100) that may be formed according to the principles of the present disclosure. In the illustrated embodiments, the slot 100 is machined into an aluminum work piece or blank 102; however, in other embodiments, the work piece 102 may comprise steel, titanium, and/or metals or metal alloys. As illustrated, the slot 100 is symmetrical with respect to a vertical centerline 104 of the slot 100, and the slot 100 includes at an upper end 106 thereof a groove portion 108, as well as a bulb portion 110 at a lower end 112 of the slot 100. In addition, the groove portion 108 includes a tapered portion 114 that leads into the bulb portion 110. As illustrated, the slot 100 is a groove that is formed into an outer surface 116 of the work piece 102 and extends down (in the "Z" direction or the groove depth) to a base 118 of the finished slot 100.

It will be appreciated, however, that in other embodiments, the presently disclosed milling method may be utilized to form slots having different geometries by utilizing different end mills and/or sequences of the same. For example, slots having upside-down "Christmas Tree" shaped geometries and that become narrower in a groove depth direction, but include lateral grooves with widths that increase and decrease such that the lateral grooves of the "Christmas Tree" slot alternately include narrow portions where the groove width becomes narrower and wide portions where the groove width becomes wider; and such alternative slots may be formed utilizing different end mills that may include, for example, end mills having "Christmas Tree" geometries. It will be appreciated that in even other embodiments, other slots having even different geometries may be formed according to the principles of the present disclosure.

Figure 2:
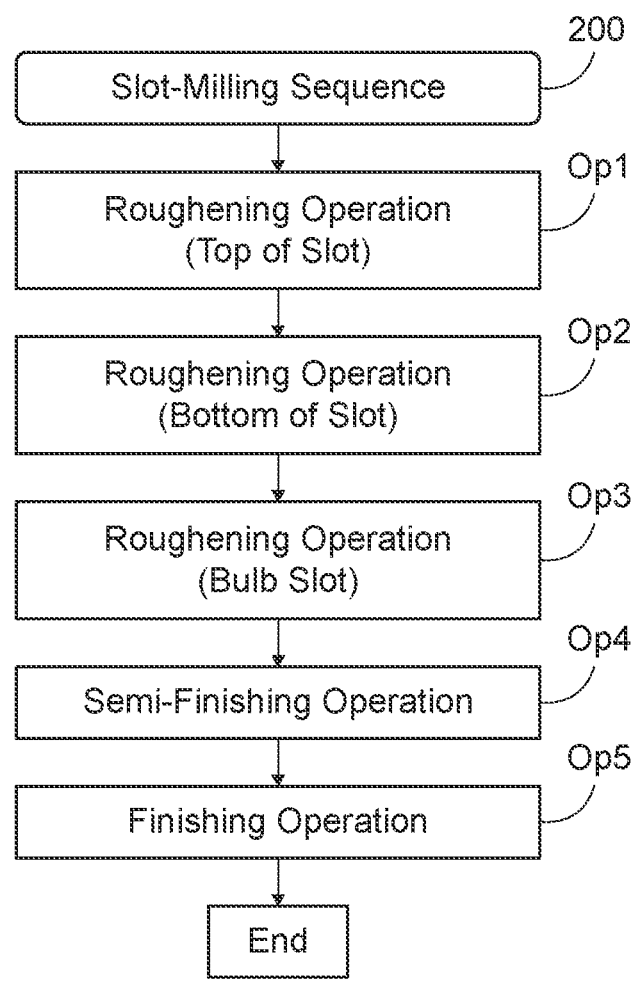
FIG. 2 is a flow chart of the slot cutting sequence according to one or more embodiments of the present disclosure.

FIG. 2 illustrates a slot milling sequence 200 that may be utilized to form the slot 100 according to one or more embodiments of the present disclosure. In the illustrated embodiment, the slot milling sequence 200 includes five distinct operations or processes. For example, the slot milling sequence 200 includes a first operation (Op1) that is a first roughening operation that removes material from the work piece 102 at the upper end 106 of the slot 100, a second operation (Op2) that is a second roughening operation that removes material from the work piece 102 at the lower end 112 of the slot 100, a third operation (Op3) that is a third roughening operation that removes material from the work piece 102 at the bulb portion 110 of the slot 100, a fourth operation (Op4) that is a semi-finishing operation that removes material from the work piece 102 at the bulb portion 110 of the slot 100, and a fifth operation (Op5) that is a finishing operation that removes material along the finished shape of the slot 100. It will be appreciated that each of the foregoing operations removes a certain amount of material, but leaves certain amounts of material (an allowance) that will be machined in one or more subsequent operations. Each of these operations is discussed below in greater detail.

Figure 3A:
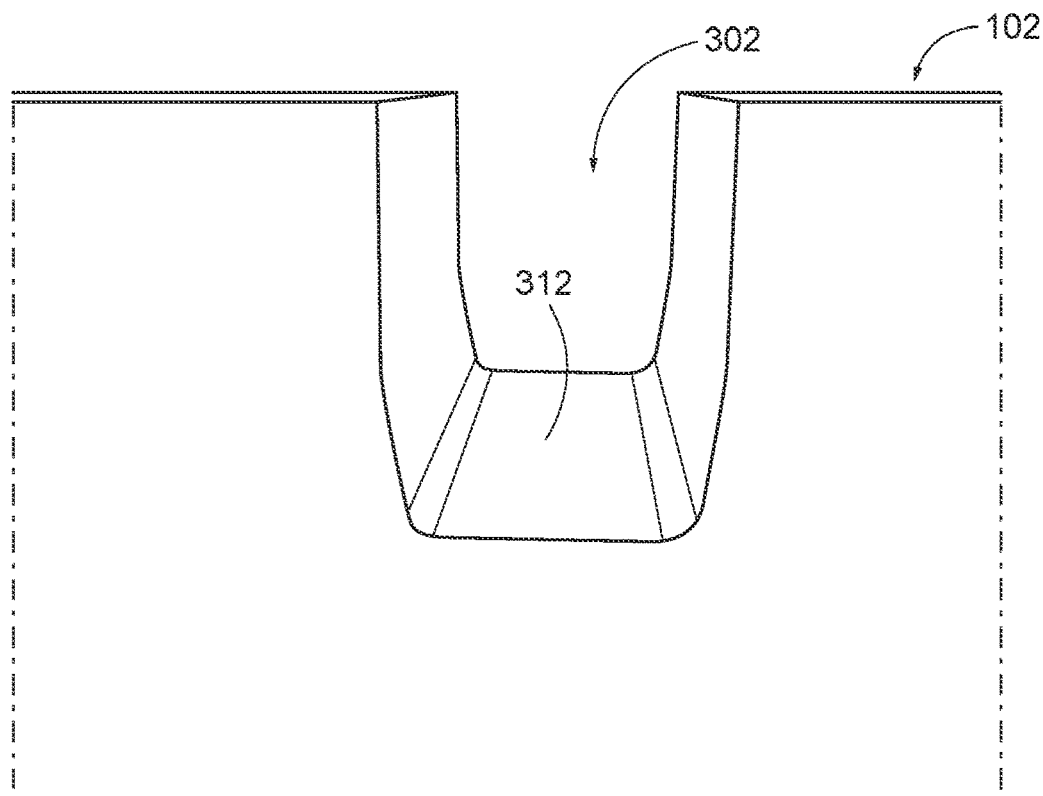
FIG. 3A is a representation of the top of the slot roughening operation (Op1) according to the principles of the present disclosure.
Figure 3B:
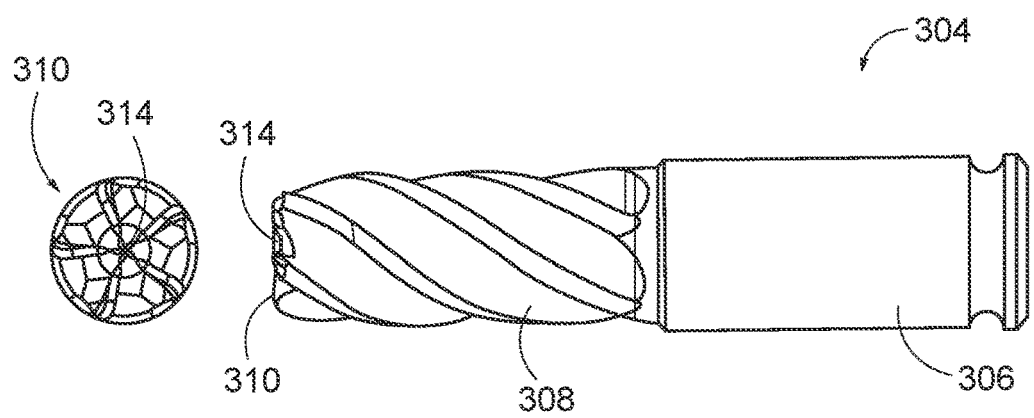
FIG. 3B is a side view of a rough cutting tool utilized in the top of the slot roughening operation (Op1) according to one or more embodiments of the present disclosure.

FIGS. 3A-3B illustrate aspects of the first operation (Op1) according to one or more embodiments. More specifically, FIG. 3A illustrates the roughening of a top portion 302 of the slot 100 that is formed during the first operation (Op1) and FIG. 3B illustrates a tool or end mill 304 utilized in the illustrated embodiment to cut or roughen the top portion 302 of the slot 100. In the illustrated embodiment, the end mill 304 is a high-performance rougher ("HPR") taper tool comprising a shank 306, and a cutting portion 308 that tapers into a cutting tip 310. Here, the end mill 304 of the first operation (Op1) is tool number S03315 iss1, and its cutting portion 308 includes an approximately 20 millimeters ("mm") diameter, whereas its cutting tip 310 includes an approximately 18 mm diameter.

In this step of the slot milling sequence 200, the end mill 304 is installed within the spindle (and/or a collet thereof) of a milling machine (not illustrated) and oriented at approximately 24 mm above (in the "Z" dimension) what would be the base 118 of the finished slot 100, and then fed through the work piece 102 at a feed rate of approximately 400 mm per minute ("mm/min"), in a trochoidal path having a trochoidal step-over of approximately 1.5 mm, and with a rotational speed of approximately 1,500 revolutions per minute ("rpm"). The end mill 304 may be secured within the spindle of the milling machine via a tool holding item such as, for example, a MST Z-Lock shrink holder. Performing the first operation (Op1) with the foregoing parameters forms the top portion 302 of the slot 100 such that the top portion 302 has a width of approximately 22 mm and such that a base 312 of the top portion 302 is approximately 24 mm above (in the "Z" dimension) the base 118 of the finished slot 100. The top portion 302 is dimensionally smaller than the (finished) slot 100 such that a first allowance remains about the top portion 302 that will be removed via one or more subsequent material removal steps. Thus, as will be appreciated, the trochoidal path of the end mill 304 produces the top portion 302 that is wider than the diameter of the end mill 304.

In some embodiments, coolant is utilized to keep the end mill 304 cool, the exposed surfaces of the top portion 302 of the slot 100 cool, to assist in removal of swarth generated during the cutting process of the first operation (Op1), and/or to provide lubrication. In one such embodiment, the end mill 304 includes a through coolant system such that coolant flows through a channel within the end mill 304 and is expelled therefrom, for example, from an aperture 314 at the cutting tip 310. In other embodiments, rather than dispensing the coolant directly from the end mill 310 itself, the coolant may instead be applied directly to the work piece 102 and the end mill 302 from a dispenser that is external to the end mill 302.

Figure 4A:
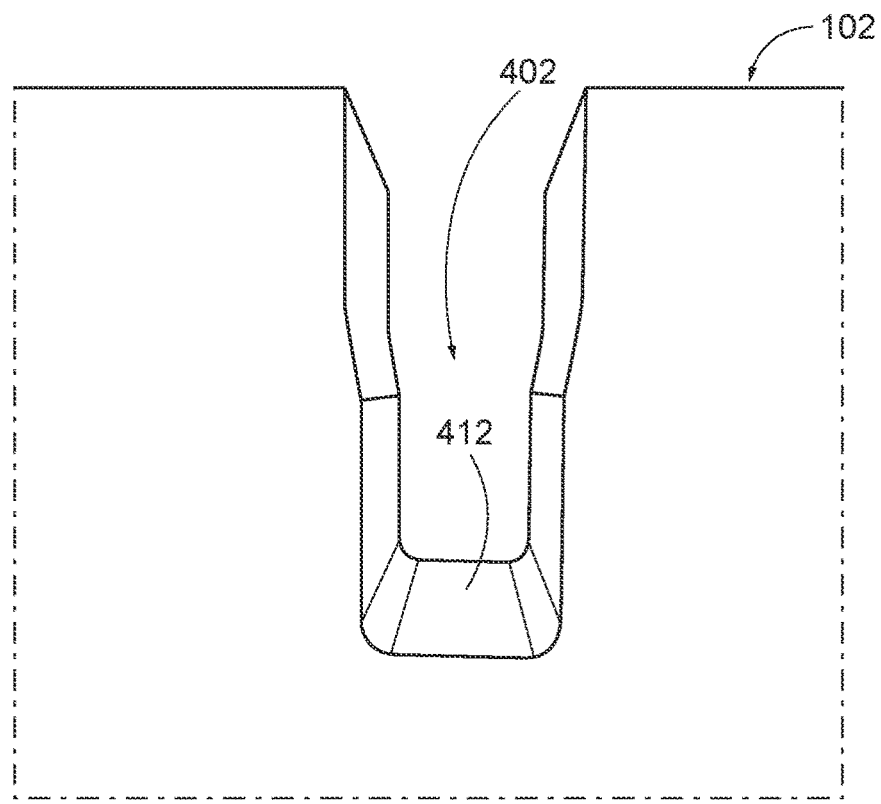
FIG. 4A is a representation of the bottom of the slot roughening operation (Op2) according to the principles of the present disclosure.
Figure 4B:
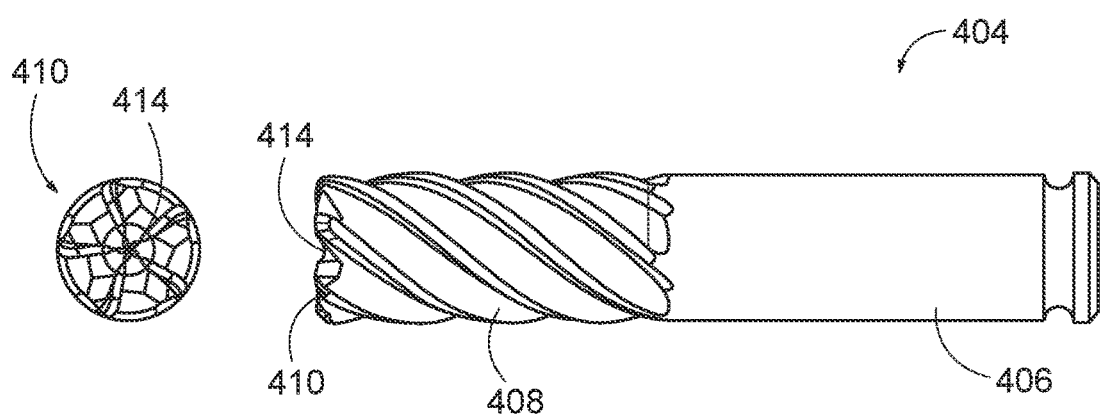
FIG. 4B is a side view of a rough cutting tool utilized in the bottom of the slot roughening operation (Op2) according to one or more embodiments of the present disclosure.

FIGS. 4A-4B illustrate aspects of the second operation (Op2) according to one or more embodiments. More specifically, FIG. 4A illustrates the roughening of a bottom portion 402 of the slot 100 that is formed during the second operation (Op2) and FIG. 4B illustrates a tool or end mill 404 utilized in the illustrated embodiment to cut or roughen the bottom portion 402 of the slot 100.

Upon completion of the first operation (Op1), the end mill 304 is removed from the spindle (and/or the collet thereof) of the milling machine, and the end mill 404 of the second operation (Op2) is installed therein. In the illustrated embodiment, the end mill 404 is a HPR tool comprising a shank 406, and a cutting portion 408 that terminates at a cutting tip 410. Here, the end mill 404 of the second operation (Op2) is tool number S03217 iss1, and the cutting portion 408 includes an approximately 20 mm diameter and the cutting tip 410 is uniform with the cutting portion 408 such that it has a diameter that is approximately equal to the diameter of the cutting portion 408 of the end mill 404; however, in some embodiments, the cutting tip 410 is tapered or bulbed.

In the illustrated embodiment, the end mill 404 of the second operation (Op2) is oriented at approximately 0.5 mm above (in the "Z" dimension) what would be the base 118 of the finished slot 100, and then fed through the work piece 102 at a feed rate of approximately 400 mm/min, in a trochoidal path having a trochoidal step-over of approximately 1.0 mm, and with a rotational speed of approximately 1,600 rpm. Performing the second operation (Op2) with the foregoing parameters forms the bottom portion 402 of the slot 100 such that the bottom portion 402 has a width of approximately 19 mm and such that a base 412 of the bottom portion 402 is approximately 0.5 mm above (in the "Z" dimension) the base 118 of the finished slot 100. The bottom portion 402 is dimensionally smaller than its corresponding portions of the (finished) slot 100 such that a second allowance remains about the bottom portion 402 that will be removed via one or more subsequent material removal steps. As will be appreciated, the trochoidal path of the end mill 404 produces a bottom portion 402 of the slot 100 that is wider than the diameter of the end mill 404.

As with the first operation (Op1), some embodiments of the second operation (Op2) may utilize a coolant to keep the end mill 404 cool, to keep the exposed surfaces of the bottom portion 402 of the slot 100 cool, to assist in removal of swarth generated during the cutting process of the second operation (Op2), and/or to provide lubrication. For example, the end mill 404 may include a through coolant system such that coolant flows through a channel within the end mill 404 and is expelled therefrom via an aperture 414 at the cutting tip 410. It will be appreciated, however, that coolant may be introduced during the second operation (Op2) in other manners as known in the art.

Figure 5A:
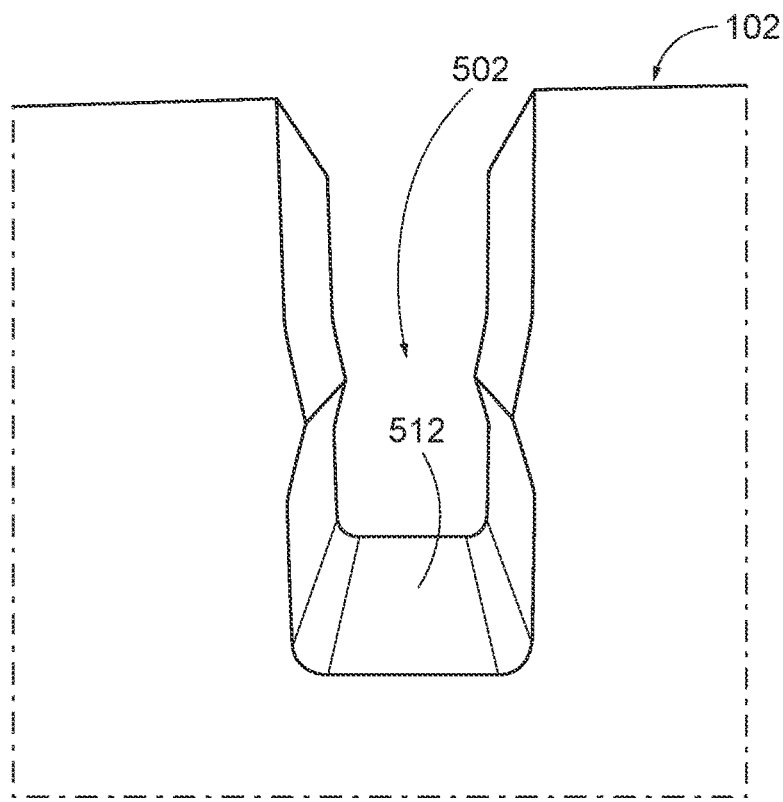
FIG. 5A is a representation of the bottom of an alternate slot roughening operation (Op2) that is formed with an alternate end mill, according to the principles of the present disclosure.
Figure 5B:
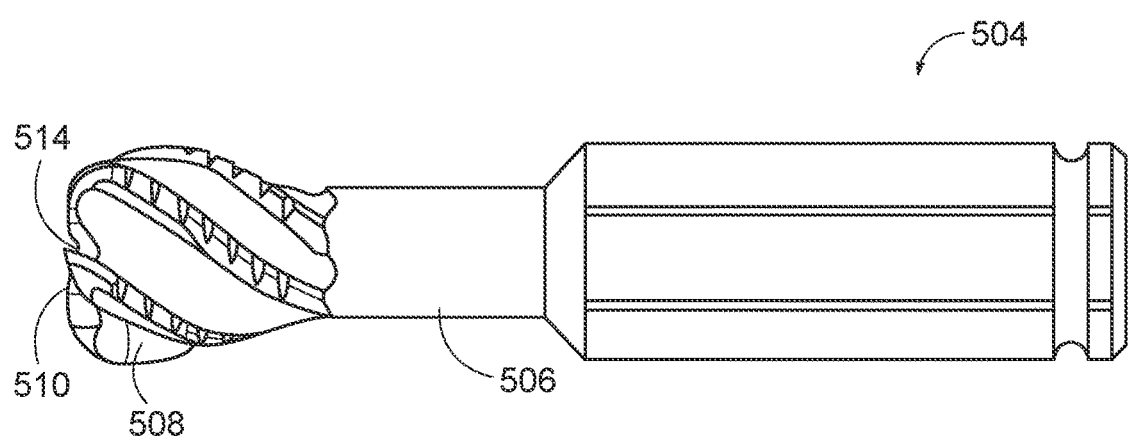
FIG. 5B is a side view of an alternate rough cutting end mill utilized in the bottom of the slot roughening operation (Op2) according to one or more embodiments of the present disclosure.

The roughening operation of the second operation (Op2) may be performed differently, for example, with a different cutter tool. FIGS. 5A-5B illustrate aspects of an alternate embodiment of the second operation (Op2) utilizing one such alternate/different cutter tool. More specifically, FIG. 5A illustrates the roughening of a bottom portion 502 of the slot 100 that may be formed during the second operation (Op2) and FIG. 5B illustrates a bulbed tool or end mill 504 utilized in the illustrated embodiment to cut or roughen the bottom portion 502 of the slot 100. It will be appreciated, however, that in even other embodiments, the second operation (Op2) includes two separate sub-operations performed one after the other, with the first such sub-operation utilizing the end mill 404 as detailed above and the second such sub-operation performed utilizing the end mill 504 (with alternate, bulbed geometry) as detailed below.

In the illustrated embodiment, the end mill 504 is an HPR tool comprising a shank 506, and a bulbed cutting portion 508 that terminates at a cutting tip 510; and, in one specific embodiment, the end mill 504 is tool number S03324 iss1 and the bulbed cutting portion 508 has an approximately 22 mm diameter.

In some embodiments, the end mill 504 of the alternate second operation (Op2) may follow the same tool path with the same operating parameters as detailed with reference to end mill 404, above. By using the end mill 504 that is bulbed rather than uniform in width along the length of its cutting portion (i.e, like the end mill 404), additional material will be removed from the work piece 102 on each side of the bottom portion 502 of the slot 100 as compared to the bottom portion 402 of the slot. Accordingly, an additional 2 mm (approximately) of material will be removed per side from the groove formed in the second operation (Op2) when utilizing the end mill 504 as opposed to the end mill 404; and the bottom portion 502 formed via the end mill 504 will be approximately 4 mm wider (2 mm per side) than the bottom portion 402 formed via the end mill 404 that is not bulbed. Despite this additional removal of material, it will be appreciated that an alternate second allowance of material remains about the bottom portion 402 that will be removed via one or more subsequent material removal steps.

Moreover, this alternate embodiment of the second operation (Op2) may utilize a coolant in a similar manner as described with reference to the first operation (Op1) and/or the other embodiment of the second operation (Op2) detailed above. Thus, for example, the end mill 504 may include a through coolant system such that coolant flows through a channel within the end mill 504 and is expelled therefrom via an aperture 514 at the cutting tip 510.

Following the roughening processes of the first and second operations (Op1, Op2), the bulb portion 110 of the bottom portion 402 (and/or the bottom portion 502) is roughened via the third operation (Op3) to form a roughened bulb slot 602 that may eventually be machined into the (finished) slot 100 via one or more subsequent operations. FIGS. 6A-6C illustrate aspects of the third operation (Op3) that form the roughened bulb slot 602 according to one or more embodiments. More specifically, FIG. 6A illustrates the roughening of a left side 602a of the roughened bulb slot 602 formed during the first pass of the third operation (Op3), whereas FIG. 6B illustrates a right side 602b of the roughened bulb slot 602 formed during the second pass of the third operation (Op3).

Upon completion of the second operation (Op2), the end mill 404 and/or 504 is/are removed from the spindle (and/or the collet thereof) of the milling machine, and an end mill 604 of the third operation (Op3) is installed therein. The end mill 604 of the third operation (Op3) is illustrated in FIG. 6C. In the illustrated embodiment, the end mill 604 is a bulbed HPR tool comprising a shank 606 that extends into a tapered portion 608, and a bulbed cutting portion 610 extending from a tapered end of the tapered portion 608 and terminating at a cutting tip 612. In the illustrated embodiment, the end mill 604 of the third operation (Op3) is tool number S02520 iss1, and the bulbed cutting portion 610 thereof has a radial depth of cut dimension (Ae) of approximately 7 mm and an approximately 32 mm diameter. In addition, the shank 606 has an approximately 20 mm diameter, whereas the tapered portion 608 extends from a non-tapered end thereof also having an approximately 20 mm diameter and tapers down to an approximately 18 mm diameter as measured at the junction between the tapered end of the tapered portion 608 and the bulbed cutting portion 610.

In this material removal process, the end mill 604 of the third operation (Op3) is oriented at approximately 0.6 mm above (in the "Z" dimension) the base 118 of the finished slot 100 and begins to rotate with a speed of approximately 600 rpm. Then, the end mill 604 is offset approximately 0.6 mm to the left of the finished surface left following the prior operation (i.e., the second operation (Op2)), so as to roughen the left side 602a of the bulb portion 110 and the tapered portion 114 of the roughened bulb slot 602 and fed straight through the work piece 102 at a feed rate of approximately 60 mm/min to perform a first profile cut. In the illustrated embodiment, this first profile cut leaves approximately 0.6 mm of material around the form to be removed by further operations. Following this first pass of the end mill 604 that roughens the left side 602*a* of the roughened bulb slot 602, the end mill 604 is offset approximately 0.6 mm to the right of the finished surface left following the prior operation (i.e., the second operation (Op2)), so as to roughen the right side 602*b* of the bulb portion 110 and the tapered portion 114 of the roughened bulb slot 602 and fed straight through the work piece 102 at a feed rate of approximately 70 mm/min to perform a second profile cut. In the illustrated embodiment, this second profile cut leaves approximately 0.6 mm of material around the form to be removed by further operations. It will be appreciated, however, that in other embodiments, the right side 602*b* is roughened on the first pass and the left side 602*a* is roughened on the second pass. Performing the third operation (Op3) with the foregoing parameters forms the left and right sides 602*a*,602*b* of the bulb portion 110 of the roughened bulb slot 602. Despite this removal of additional material, it will be appreciated that a third allowance of material remains, for example, about the bulb portion 110 and the tapered portion 114 of the roughened bulb slot 602, that will be removed via one or more subsequent material removal steps.

In at least some embodiments, the third operation (Op3) includes utilization of a coolant to keep the end mill 604 cool, to keep the exposed portions of the left and right sides 602*a*,602*b* of the bulb portion 110 cool during roughening, to assist in removal of swarth generated during the cutting process of the third operation (Op3), and/or to provide lubrication. In one embodiment, a flood coolant system is utilized; however, in other embodiments, the end mill 604 may be arranged with a through coolant system as described above.

Figure 7A:
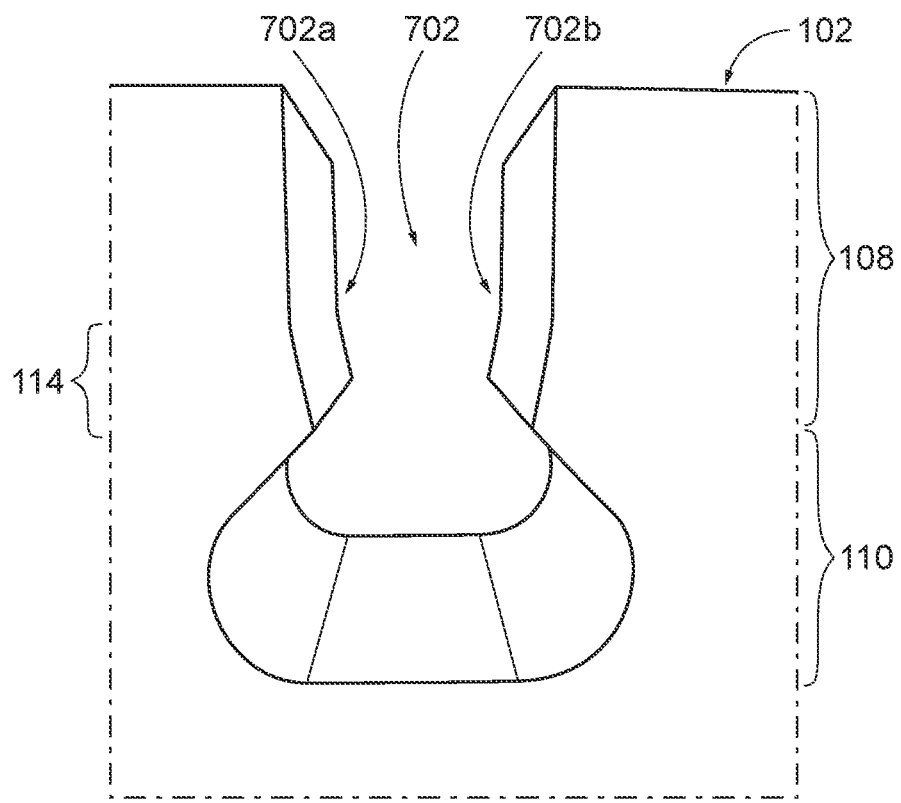
FIG. 7A is a representation of the semi-finishing operation (Op4) according to the principles of the present disclosure.
Figure 7B:
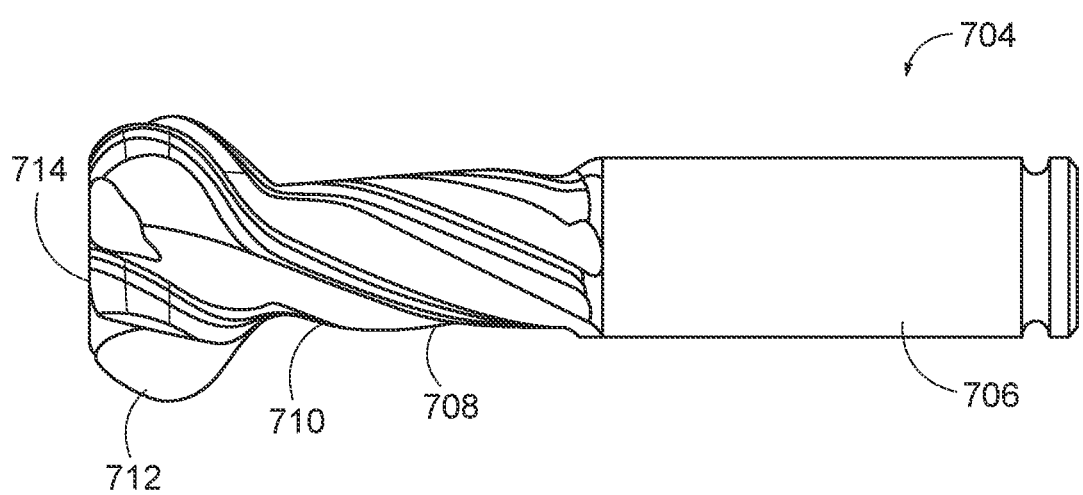
FIG. 7B is a side view of a bulb cutting tool utilized in the semi-finishing operation (Op4) according to one or more embodiments of the present disclosure.

Following the bulb roughing process of the third operation (Op3), the groove portion 108 (including the tapered portion 114) and the bulb portion 110 of roughened bulb slot 602 undergo a semi-finishing process via the fourth operation (Op4). FIGS. 7A-7B illustrate aspects of the fourth operation (Op4) according to one or more embodiments. More specifically, FIG. 7A illustrates the semi-finishing process that forms a semi-finished slot 702 having a left and right side 702*a,b* via the fourth operation (Op4), and illustrates the groove portion 108 and the bulb portion 110 of the semi-finished slot 702 that are at least partially finished during the fourth operation (Op4). FIG. 7B illustrates a tool or end mill 704 utilized in the illustrated embodiment to machine the left and right sides 702*a,b* of the semi-finished slot 702 that may thereafter be machined into the (finished) slot 100 via one or more subsequent operations.

Thus, upon completion of the third operation (Op3), the end mill 604 is removed from the spindle (and/or the collet thereof) of the milling machine, and the end mill 704 of the fourth operation (Op4) is installed therein. In the illustrated embodiment, the end mill 704 is an HPR bulbed-taper tool comprising a shank 706, a cutting portion 708 that extends into a tapered cutting portion 710, and a bulbed cutting portion 712 extending from a tapered end of the tapered cutting portion 710 and terminating at a cutting tip 714. In the illustrated embodiment, the end mill 704 of the fourth operation (Op4) is tool number S02560 iss1, and the bulbed cutting portion 712 thereof has a radial depth of cut dimension (Ae) of approximately 0.45 mm and an approximately 33.5 mm diameter. In this embodiment, the cutting portion 708 of the end mill 704 has an approximately 20 mm diameter and the tapered cutting portion 710 tapers down to an approximately 18 mm diameter as measured at the junction between the tapered end of the tapered cutting portion 710 and the bulbed cutting portion 712.

Here, the end mill 704 of the fourth operation (Op4) is oriented at approximately 0.15 mm above (in the "Z" dimension) the base 118 of the finished slot 100 and begins to rotate with a speed of approximately 550 rpm. Then the end mill 704 is offset approximately 0.15 mm to the left of the finished surface left following the prior operation (i.e., the third operation (Op3)), to roughen the left side 702*a* of the groove portion 108 and the bulb portion 110 of the semi-finished slot 702, and fed straight through the work piece 102 at a feed rate of approximately 68 mm/min to perform a first profile cut. Following this first pass of the end mill 704 that roughens the left side 702*a* of the semi-finished slot 702, the end mill 704 is offset approximately 0.15 mm to the right of the finished surface left following the prior operation (i.e., the third operation (Op3)), so as to roughen the right side 702*b* of the groove portion 108 and the bulb portion 110 of the semi-finished slot 702, and fed straight through the work piece 102 at a feed rate of approximately 68 mm/min to perform a second profile cut. It will be appreciated, however, that in other embodiments the right side 702*b* may be roughened on the first pass and the left side 702*a* may be roughened on the second pass.

Performing the fourth operation (Op4) removes material from the left and right sides 602*a,b* of the roughened bulb slot 602 to form the semi-finished slot 702, and machines portions of the roughened bulb slot 602, for example, the groove portion 108 and the bulb portion 110, so there will be consistent stock left for subsequent operations, such as a finishing operation. Despite this removal of additional material, it will be appreciated that a fourth allowance of material remains, for example, about the groove portion 108 and the bulb portion 110 on the left and right sides 702*a,b* of the semi-finished slot 702, that will be removed via one or more subsequent material removal steps. In the illustrated embodiment, In the illustrated embodiment, the first and second profile cuts performed in the fourth operation (Op4) leave approximately 0.15 mm of material around the form to be removed by further operations.

In addition, the fourth operation (Op4) may utilize a coolant system as described above, for example, to keep the end mill 704 cool, to keep the exposed portions of the left and right sides 702*a*,702*b* of the groove portion 108 and the bulb portion 110 cool during roughening, to assist in removal of swarth generated during the cutting process of the fourth operation (Op4), and/or to provide lubrication. Thus, a flood coolant system may be utilized as described with reference to the third operation (Op3); however, in other embodiments, the end mill 704 may be arranged with a through coolant system.

Figure 8A:
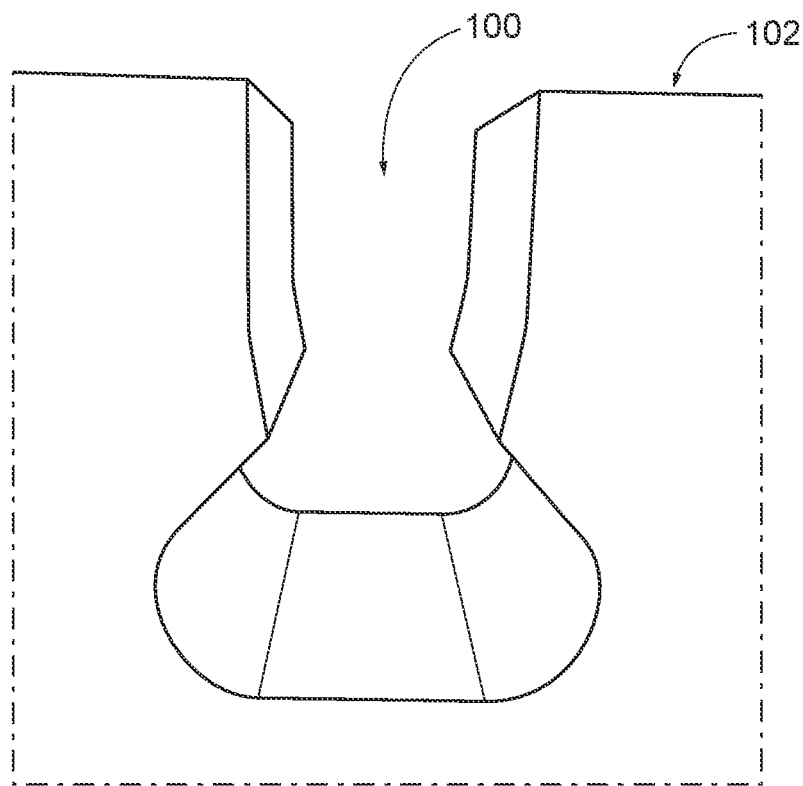
FIG. 8A is a representation of the finishing operation (Op5) according to the principles of the present disclosure.
Figure 8B:
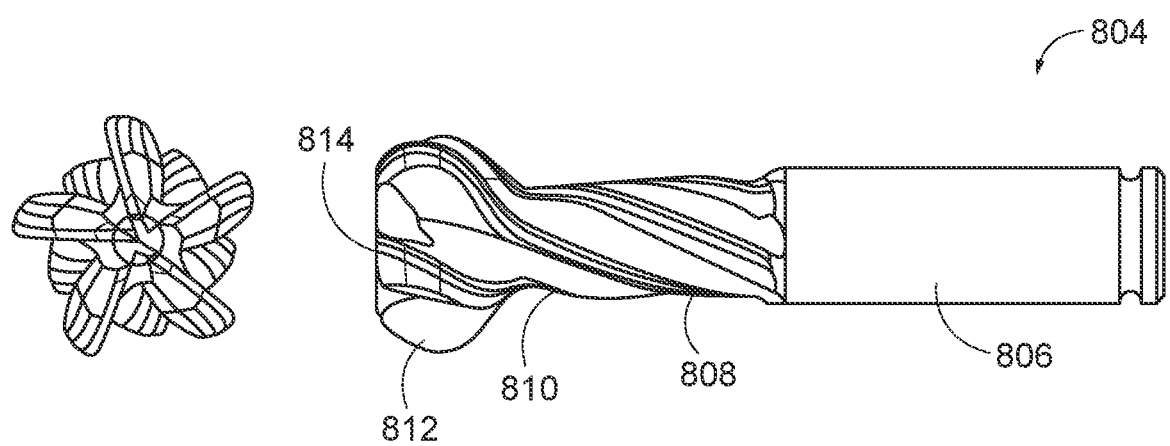
FIG. 8B is a side view of a bulb cutting tool utilized in the finishing operation (Op5) according to one or more embodiments of the present disclosure.

Following the semi-finishing process of the fourth operation (Op4), the semi-finished slot 702 (resulting from the fourth operation (Op4)) may be subjected to a finishing process such as the fifth operation (Op5), which removes any remaining allowances (e.g., the fourth allowance) to form the (finished) slot 100. FIGS. 8A-8B illustrate aspects of the fifth operation (Op5) according to one or more embodiments. More specifically, FIG. 8A illustrates the slot 100 that has been finished according to the fifth operation (Op5). FIG. 8B illustrates a tool or end mill 804 utilized in the illustrated embodiment to machine the left and right sides 702*a,b* of the semi-finished slot 702 to form the groove portion 108 and the bulb portion 110 of the (finished) slot 100.

Upon completion of the fourth operation (Op4), the end mill 704 is removed from the spindle (and/or the collet thereof) of the milling machine, and the end mill 804 of the fifth operation (Op5) is installed therein. In the illustrated embodiment, the end mill 804 is a finishing tool comprising a shank 806, a cutting portion 808 that extends/tapers into a tapered portion 810 thereof, and a bulbed cutting portion 812 that extends from a tapered end of the tapered portion 810 and terminates at a cutting tip 814. In the illustrated embodiment, the end mill 804 is tool number S02515 iss1, and the bulbed cutting portion 812 thereof has a radial depth of cut dimension (Ae) of approximately 0.15 mm and an approximately 35 mm diameter. In this embodiment, the cutting portion 808 of the end mill 804 has an approximately 20 mm diameter and the tapered cutting portion 810 tapers down to approximately 18 mm in diameter as measured at the junction between the tapered end of the tapered cutting portion 810 and the bulbed cutting portion 812.

Here, the end mill 804 of the fifth operation (Op5) is oriented (in the "Z" dimension) relative to the semi-finished slot 702 at the depth of the (finished) slot 100 (i.e., oriented at a depth corresponding to the base 118 of the (finished) slot 100) and begins to rotate with a speed of approximately 600 rpm. Then the end mill 804 is offset to the left of the centerline 104 to finish the left side 702a of the semi-finished slot 702 via a first pass where the end mill 804 is fed straight through the work piece 102 at a feed rate of approximately 100 mm/min to perform a first profile finish cut. Then the end mill 804 is offset to the right of the centerline 104 to finish the right side 702b of the semi-finished slot 702 via a second pass where the end mill 804 is fed straight through the work piece 102 at a feed rate of approximately 100 mm/min to perform a second profile finish cut. Here, the end mill 804 may be offset to the left and right of the center line 104 to create the final form of the slot. Thus, the end mill 804 may be off set at various distances depending on the dimension of the end mill 804 utilized in order to bring the end mill 804 to the position to create the finish form, and the amount of offset may vary depending on the dimensions of the end mill 804, and the dimensions of each of the preceding tools, which dimensions may vary based on how they are staged or re-ground as detailed below.

Performing the fifth operation (Op5) removes material from the left and right sides 702a,b of the semi-finished slot 702 to form the (finished) slot 100, and finishes/machines the entirety of the of the semi-finished slot 702, including the groove portion 108 and the bulb portion 110, thereby improving the surface finish of the slot 100 after the bulk of the material has been removed via prior machining operations. In addition, the fifth operation (Op5) may utilize a coolant system as described above, for example, to keep the end mill 804 cool, to keep the exposed portions of the left and right sides 702a,702b of the semi-finished slot 702 cool during finishing, to assist in removal of swarth generated during the cutting process of the fifth operation (Op5), and/or to provide lubrication. Thus, a flood coolant system may be utilized as described with reference to the third and fourth operations (Op3, Op4); however, in other embodiments, the end mill 804 may be arranged with a through coolant system.

Figure 9:
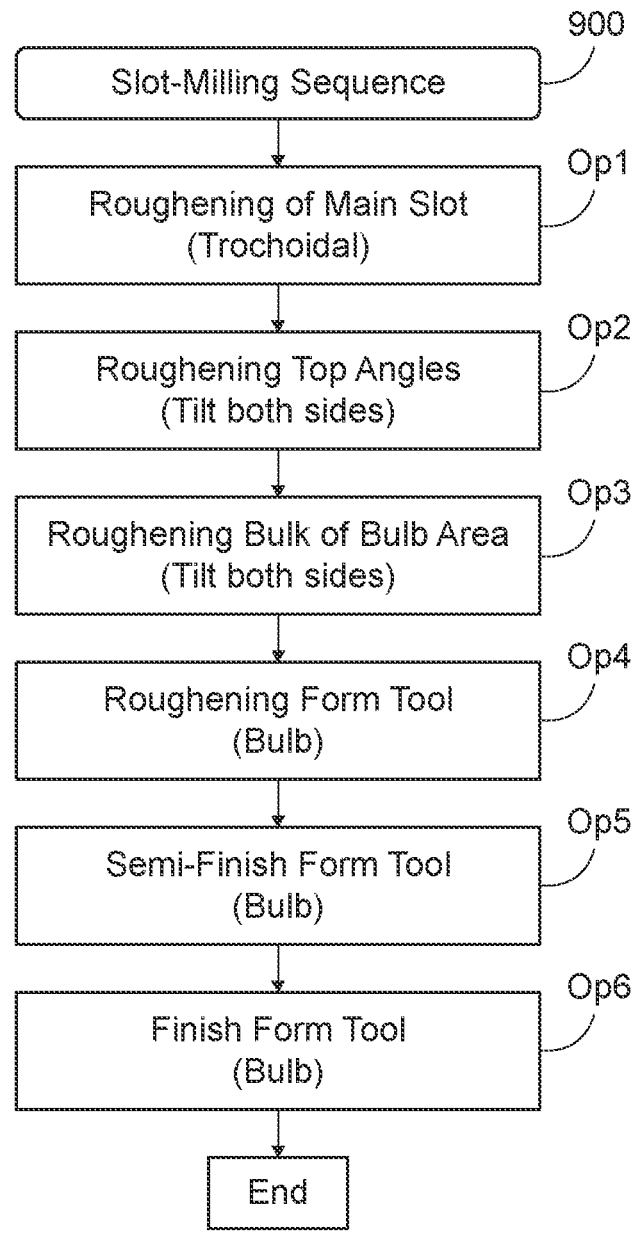
FIG. 9 is a flow chart of an alternate slot cutting sequence according to one or more embodiments of the present disclosure.
Figure 10:
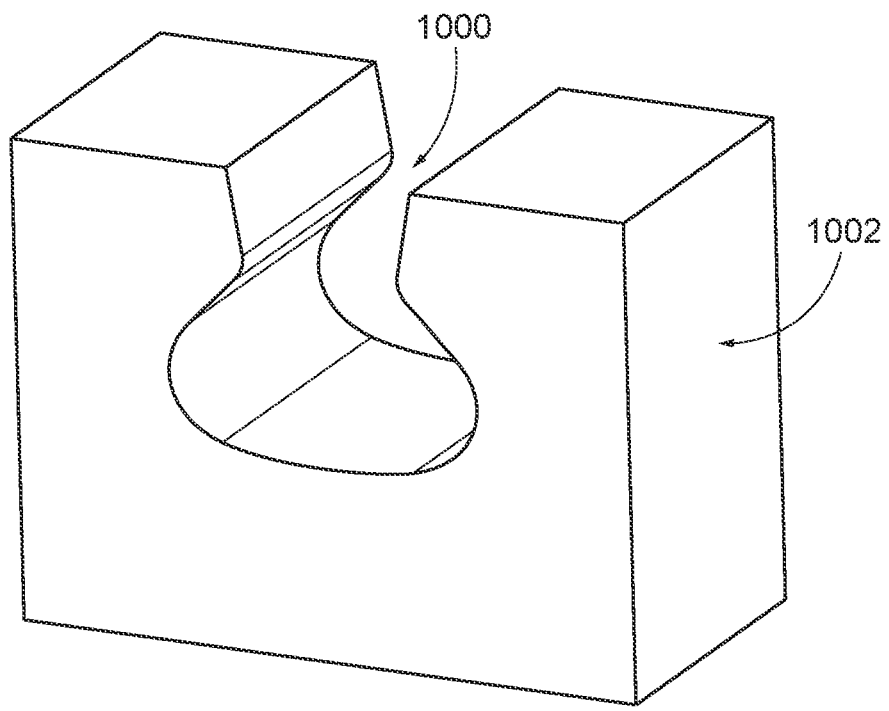
FIG. 10 illustrates a slot formed utilizing the slot milling sequence of FIG. 9.

Also disclosed herein are alternate machining sequences for machining a slot, such as the slot 100 or other slots having different dimensions and/or form characteristics. FIG. 9 illustrates an alternate slot milling sequence 900 that may be utilized to form a slot, according to one or more other embodiments of the present disclosure. FIG. 10 illustrates a slot 1000 formed in a work piece 1002 utilizing the slot milling sequence 900 of FIG. 9. Either the slot method 200 of FIG. 2 or the slot milling sequence 900 of FIG. 9 may be utilized depending on the parameters of a particular application. For example, the slot milling sequence 200 may be utilized in applications where access to the work piece is limited.

Figure 11:
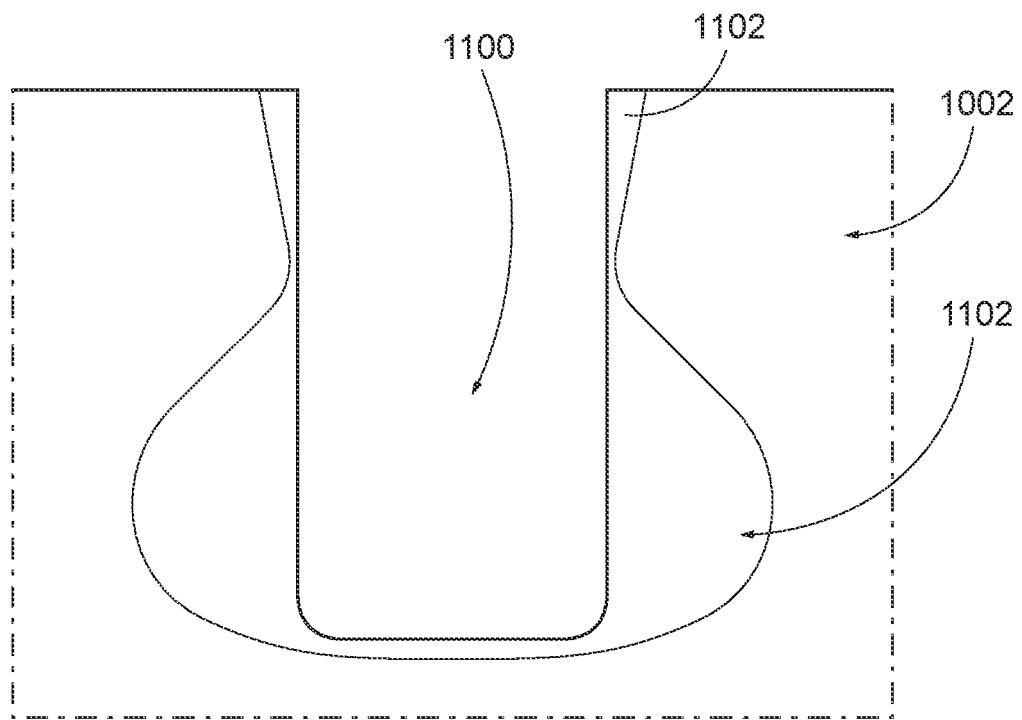
FIG. 11 illustrates a main portion of the slot of FIG. 10 roughened via a first operation of the milling sequence of FIG. 9.

In the illustrated embodiment, the slot milling sequence 900 includes six distinct operations or processes. For example, the slot milling sequence 900 includes a first operation (Op1), which is a first roughening operation that removes material from the work piece 1002 to form a main portion 1100 of the slot 1000. FIG. 11 illustrates the main portion 1100 of the slot 1000 formed via the milling sequence 900, according to one or more embodiments. The first operation (Op1) of the slot milling sequence 900 may be performed utilizing a high performance rougher end mill that follows a straight tool pass through the work piece 1002 or via trochoidal milling tool path. In the illustrated embodiment, the first operation (Op1) utilizes a trochoidal milling process to roughen the main portion 1100 of the slot 1000. The first operation (Op1) of the slot milling sequence 900 may be identical or substantially similar to the first operation (Op1) of the slot milling sequence 200 illustrated with respect to FIG. 2. FIG. 11 also illustrates an allowance 1102, which is remaining material of the work piece 1002 that will be removed in subsequent operations to form the slot 1000.

Figure 12A:
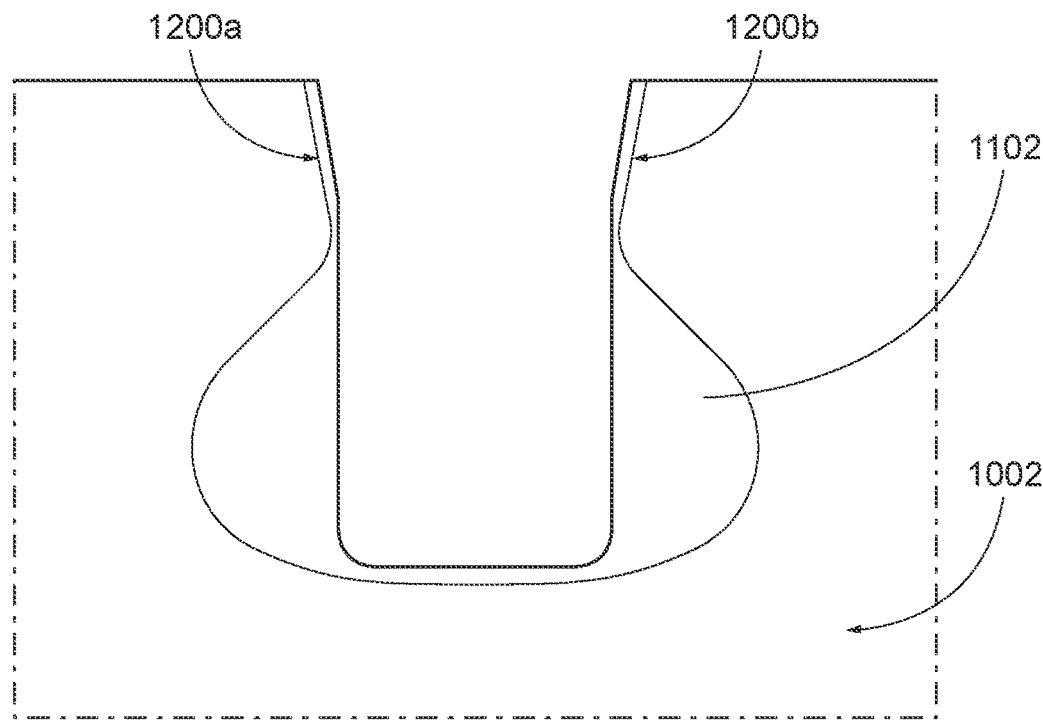
FIGS. 12A-12C illustrates the upper angle portions roughened via a second operation of the milling sequence of FIG. 9 when forming of the slot of FIG. 10.
Figures 12B, 12C:
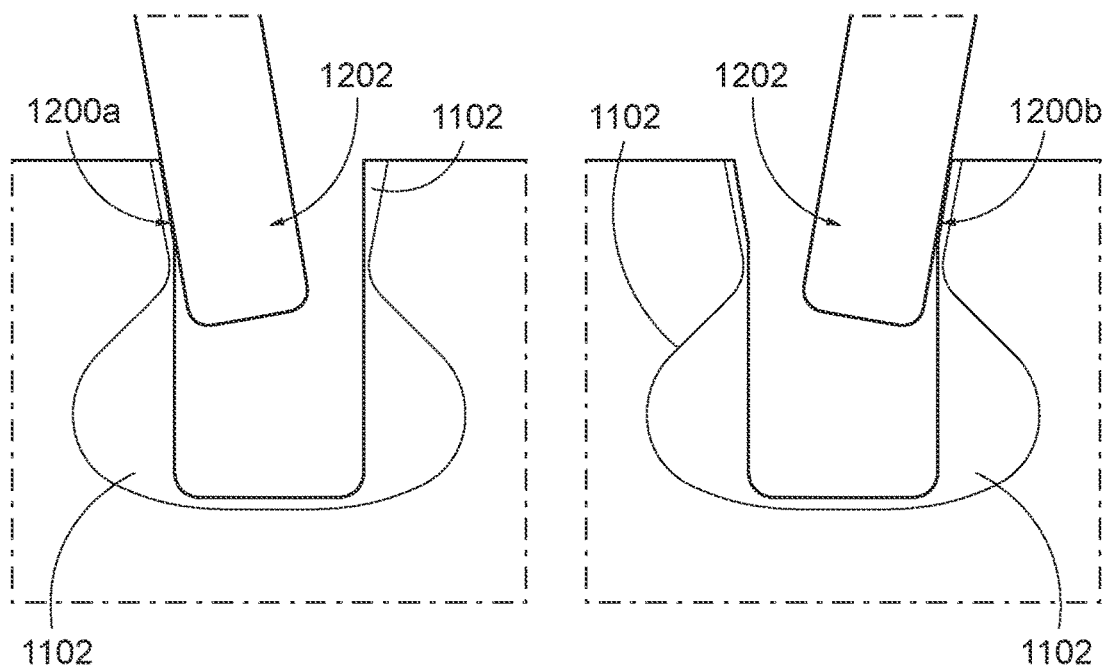

The slot milling sequence 900 may also include a second operation (Op2), which is a second roughening operation. In contrast to the second operation (Op2) of the slot milling sequence 200 illustrated with respect to FIG. 2, the second operation (Op2) of the slot milling sequence 900 may be utilized to roughen and remove material from the work piece 1002 at the upper end of the slot 1000 to form upper angle portions 1200a,1200b during formation of the slot 1000. Also, the second operation (Op2) of the slot milling sequence 900 may utilize the same high performance roughing end mill or other roughening milling tool that was utilized in first operation (Op1) of the slot milling sequence 900. Utilization of the same roughing tooling will save time and cost, as less tools are used and the machines do not need to be shut down to replace the tooling therein. FIGS. 12A-12C illustrate the upper angle portions 1200a,1200b formed via the second operation (Op2) of the milling sequence 900, according to one or more embodiments. Here, a cutting tool 1202 (i.e., the cutting tool utilized in the first operation (Op1) of the slot milling sequence 900) is tipped or tilted such that it is oriented at an angle relative to the work piece 1002. In the illustrated embodiment, the cutting tool 1202 is oriented at an angle of ten degrees relative to the work piece 1002; however, it may be oriented at other angle depending on the particular end use application, for example, at an angle between five to fifteen degrees. Indeed, the cutting tool 1202 may be tilted at various other angles as may be determined by the geometry of the subsequently utilized form tools (e.g., such as bulb tools) in the fourth, fifth, and sixth operations described below. The tipping or tilting angle of the cutting tool 1202 may correspond with the geometry of the form tools utilized in subsequent steps. Once the cutting tool 1202 is tipped or tilted into the appropriate angular orientation relative to the work piece 1002, the cutting tool 1202 is passed through the main portion 1100 of the slot 1000 a first time to roughen one of the upper angle portions 1200a,1200b, and then the cutting tool 1202 is passed there through a second time to roughen the second of the upper angle portions 1200a,1200b. FIGS. 12A-12C also illustrates the allowance 1102 that remains in the work piece 1002 following the second operation (Op2) and that will be removed during subsequent operations to form the slot 1000, with FIG. 12B illustrating removal of the allowance 1102 (remaining following the first operation (Op1)) along the left hand side of the slot and FIG. 12C illustrating removal of the allowance 1102 (remaining following the first operation (Op1)) along the right hand side of the slot.

The slot milling sequence 900 may also include a third operation (Op3), which is a third roughening operation. The third operation (Op3) of the slot milling sequence 900 may be utilized to roughen and remove bulk material from the work piece 1002 at the lower end of the slot 1000 to form lower angle portions 1300a,1300b during formation of the slot 1000. This roughening step will remove the bulk of the material in the bulb portion or bottom portion of the slot 1000, which will reduce load exerted on subsequent tools. Accordingly, subsequent tools (e.g., subsequent form roughing tools) may encounter reduced stress as they are removing less material, which may otherwise require design changes to subsequent form roughing tools and may also inhibit tool conversion and staging (e.g., converting a finishing tool to a semi-finishing tool and then converting the semi-finishing tool to a form roughing tool) as described below. Also, the third operation (Op3) of the slot milling sequence 900 may utilize the same roughening milling tool as was utilized in first operation (Op1) and the second operation (Op2) of the slot milling sequence 900. Utilization of the same roughing tooling for a third consecutive roughening operation will create even more efficiency by saving additional time and cost in the form of less equipment down time to change tooling and utilization of less tooling. FIGS. 13A-13C illustrate the lower angle portions 1300a,1300b formed via the third operation (Op3) of the milling sequence 900, according to one or more embodiments. Similar to the second operation (Op2), the cutting tool 1202 (i.e., the cutting tool utilized in the first operation (Op1) and the second operation (Op2) of the slot milling sequence 900) is tipped or tilted such that it is oriented at an angle relative to the work piece 1002. The cutting tool 1202 may be oriented at various angles relative to the work piece 1002 to facilitate removal of the bulk of the material from the bulb area of the slot 1000. In the illustrated embodiment, the cutting tool 1202 is oriented at an angle of fifteen (15) to seventeen (17) degrees relative to the work piece 1002; however, it may be oriented at other angles, greater or larger, depending on the particular end use application, for example, at an angle between five (5) to twenty (20) degrees. Indeed, the cutting tool 1202 may be tilted at various other angles as may be determined by the geometry of the subsequently utilized form tools (e.g., such as bulb tools) in the fourth, fifth, and sixth operations described below. The tipping or tilting angle of the cutting tool 1202 may correspond with the geometry of the form tools utilized in subsequent steps. In some embodiments, the cutting tool 1202 is moved in a 3D arc so that it follows the bottom of the slot when moving to create the arc slot. Once the cutting tool 1202 is tipped or tilted into the appropriate angular orientation relative to the work piece 1002, the cutting tool 1202 is passed through the main portion 1100 of the slot 1000 a first time to roughen one of the lower angle portions 1300a,1300b, and then the cutting tool 1202 is passed there through a second time to roughen the second of the lower angle portions 1300a,1300b. FIGS. 13A-13C also illustrates the allowance 1102 that remains in the work piece 1002 following the third operation (Op3) and that will be removed during subsequent operations to form the slot 1000, with FIG. 13B illustrating removal of the allowance 1102 (remaining following the second operation (Op2)) along the left hand side of the slot and FIG. 13C illustrating removal of the allowance 1102 (remaining following the second operation (Op2)) along the right hand side of the slot.

Figure 14A:
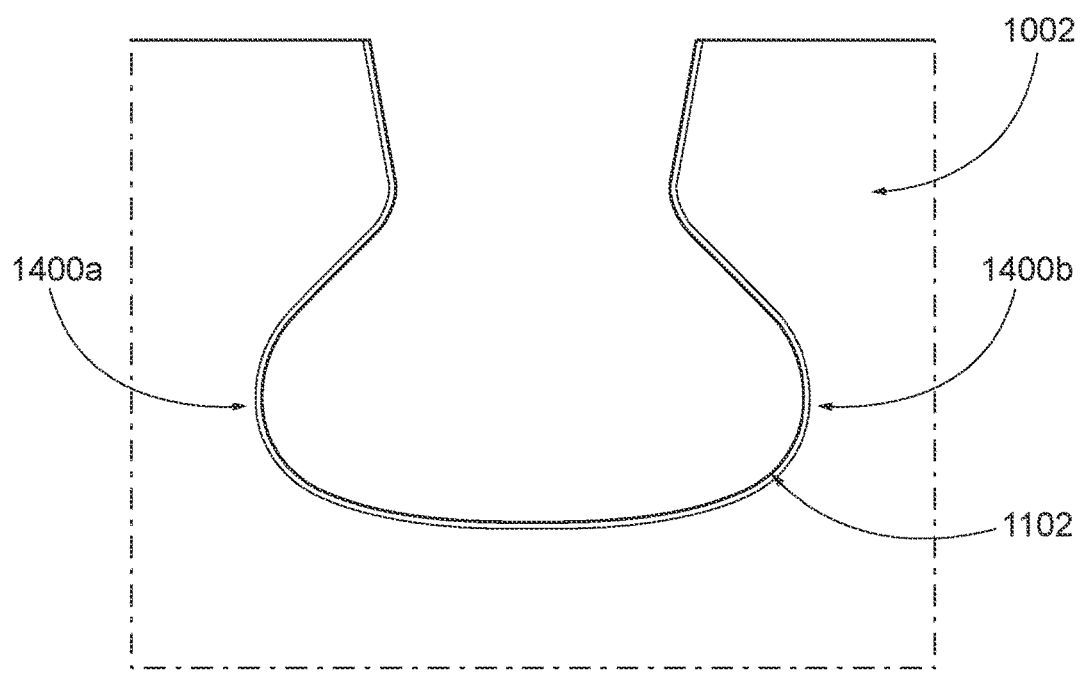
FIGS. 14A-14C illustrate bulbs roughened via a fourth operation of the milling sequence of FIG. 9 when forming of the slot of FIG. 10.
Figures 14B, 14C:
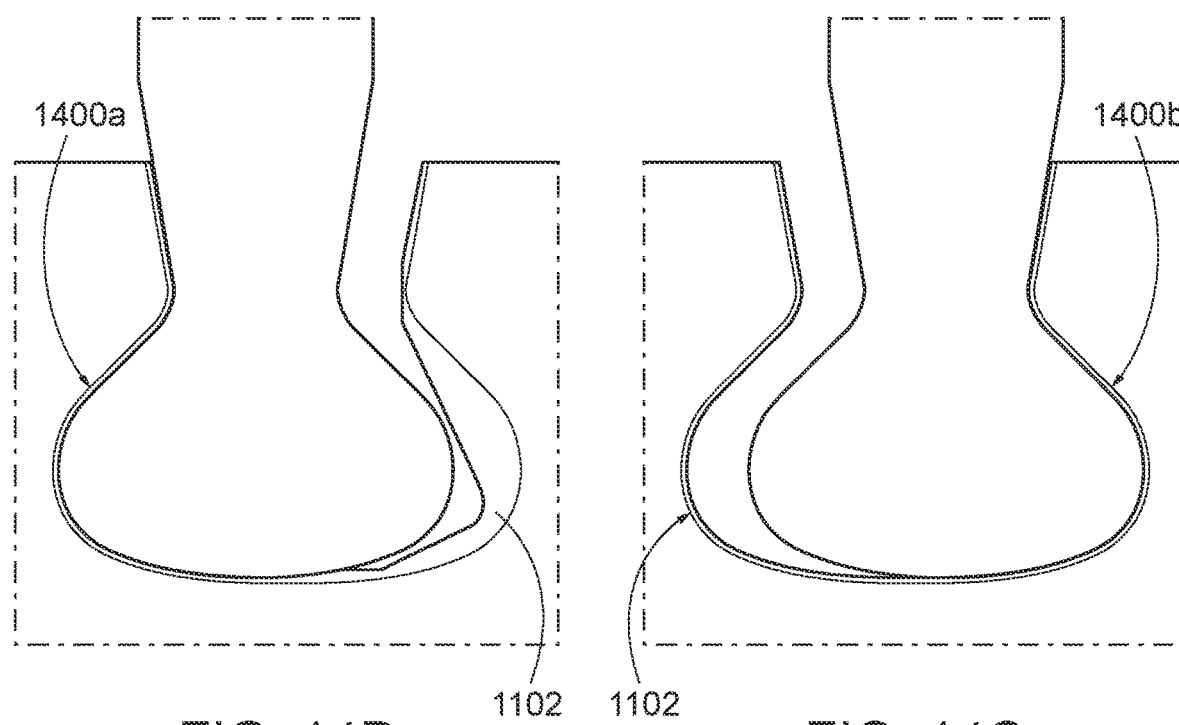

The slot milling sequence 900 may also include a fourth operation (Op4) which is a third roughening operation. The fourth operation (Op4) may utilize a form tool such as a bulb tool and may be performed substantially similar to or the same as the third operation (Op3) of the slot milling sequence 200 of FIG. 2, described above. Thus, the roughening form tool may make two passes in total to roughen each side of the slot, with a first pass removing material on a first side and a second pass removing material on a second side to form the slot 1000. FIGS. 14A-14C illustrate bulbs 1400a,1400b roughened via the fourth operation (Op4) of the milling sequence 900, according to one or more embodiments. FIGS. 14A-14C also illustrates the allowance 1102 that remains in the work piece 1002 following the fourth operation (Op4) and that will be removed during subsequent operations to form the slot 1000, with FIG. 14B illustrating removal of the allowance 1102 (remaining following the third operation (Op3)) along the left hand side of the slot and FIG. 14C illustrating removal of the allowance 1102 (remaining following the third operation (Op3)) along the right hand side of the slot.

Figure 15A:
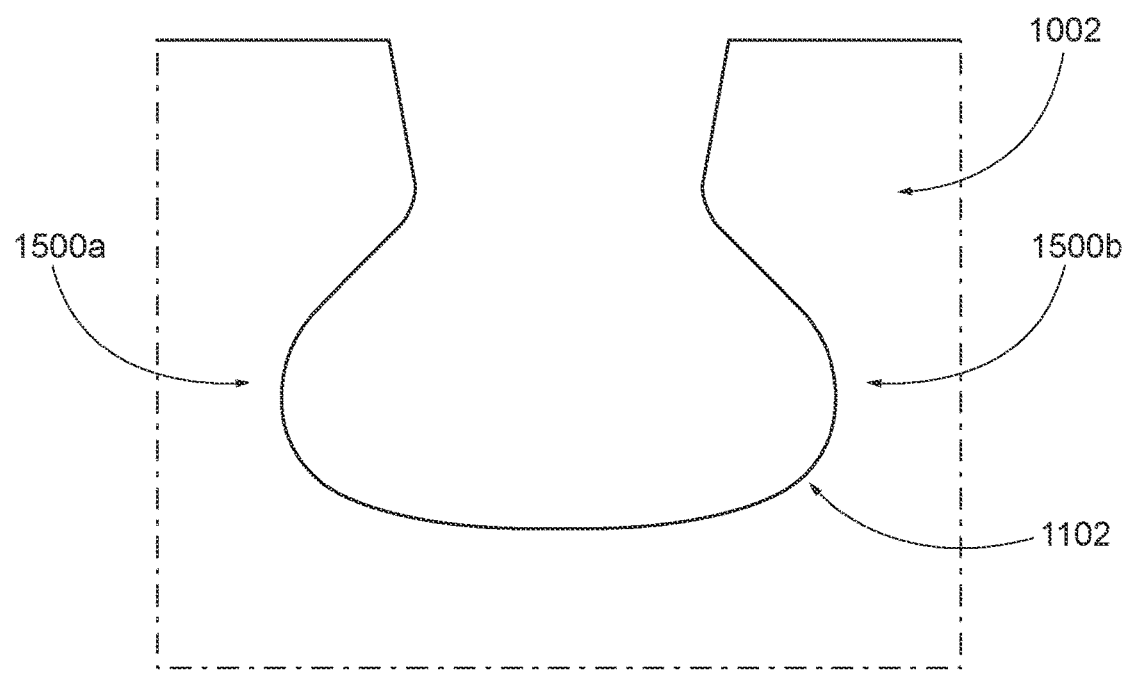
FIGS. 15A-15C illustrate semi-finished sides formed via a fifth operation of the milling sequence of FIG. 9 when forming of the slot of FIG. 10.
Figure 15B:
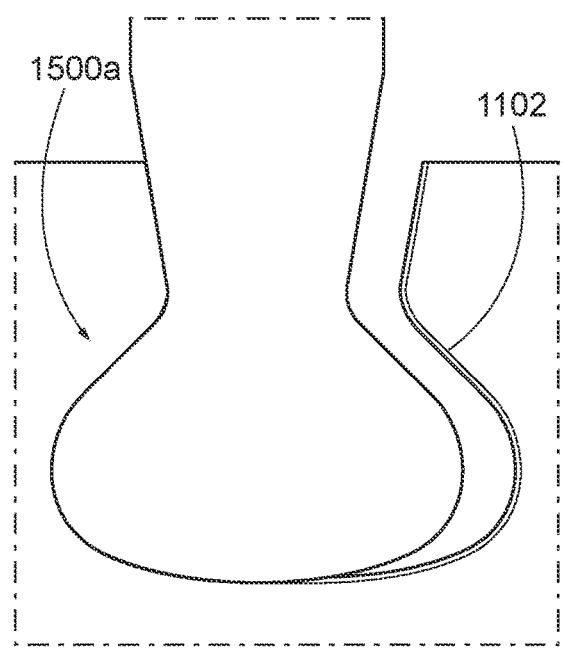
Figure 15C:
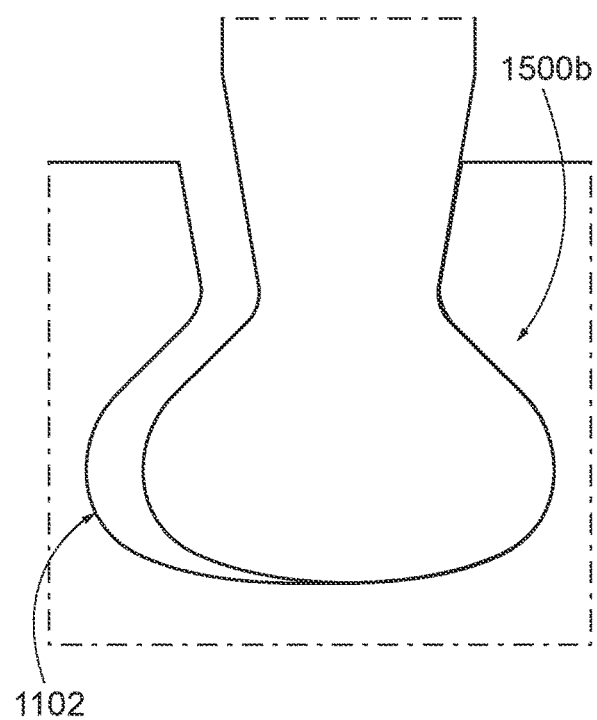

The slot milling sequence 900 may also include a fifth operation (Op5) which is a semi-finishing operation. The fifth operation (Op5) may utilize a form tool such as a semi-finishing bulb tool and may be performed substantially similar to or the same as the fourth operation (Op4) of the slot milling sequence 200 of FIG. 2, described above. Thus, the semi-finishing form tool may make two passes in total to engage each side of the slot, with a first pass removing material on a first side and a second pass removing material on a second side to form the slot 1000. FIGS. 15A-15C illustrate semi-finished sides 1500a,1500b formed via the fifth operation (Op5) of the milling sequence 900, according to one or more embodiments. FIGS. 15A-15C also illustrates the allowance 1102 that remains in the work piece 1002 following the fifth operation (Op5) and that will be removed during the subsequent operation to form the slot 1000, with FIG. 15B illustrating removal of the allowance 1102 (remaining following the fourth operation (Op4)) along the left hand side of the slot and FIG. 15C illustrating removal of the allowance 1102 (remaining following the fourth operation (Op4)) along the right hand side of the slot.

Figure 16A:
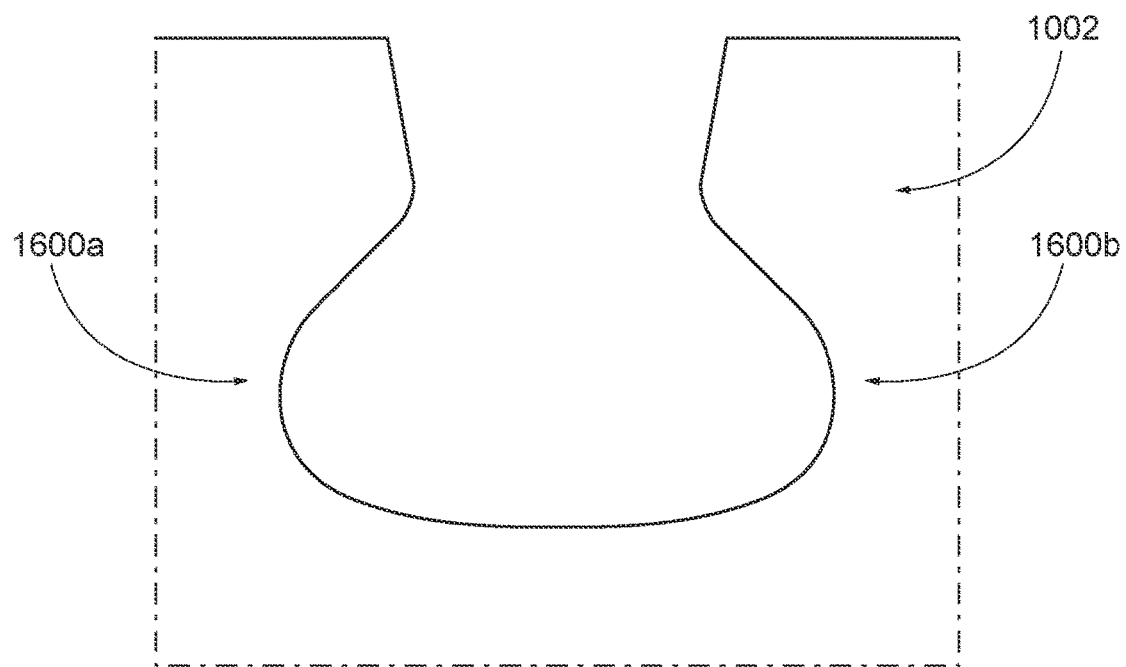
FIGS. 16A-16C illustrate finished sides formed via a sixth operation of the milling sequence of FIG. 9 when forming of the slot of FIG. 10.
Figures 16B, 16C:
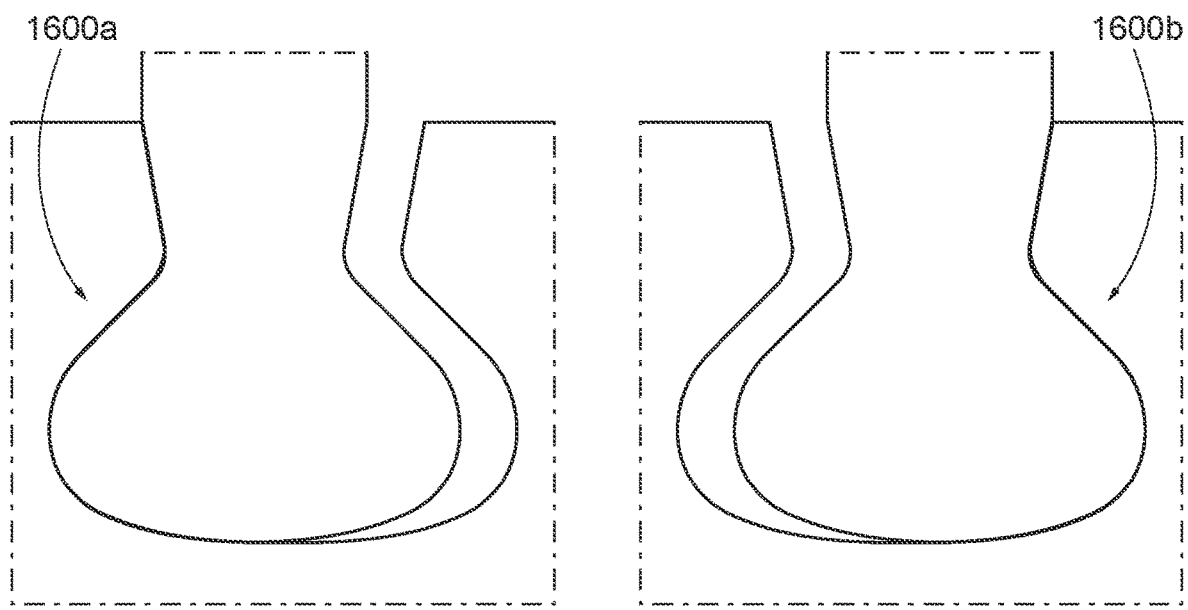

The slot milling sequence 900 may also include a sixth operation (Op6) which is a finishing operation. The sixth operation (Op6) may utilize a form tool such as a finishing bulb tool and may be performed substantially similar to or the same as the fifth operation (Op5) of the slot milling sequence 200 of FIG. 2, described above. Thus, the finishing form tool may make two passes in total to finish each side of the slot, with a first pass finishing a first side of the slot 1000 and a second pass finishing a second side of the slot 1000. FIGS. 16A-16C illustrate finished sides 1600a,1600b formed via the sixth operation (Op6) of the slot milling sequence 900, according to one or more embodiments. Here, no allowance remains in the work piece 1002 following the sixth operation (Op6) as the slot 1000 has been "finished" via this finishing operation.

In some instances, a smearing or "black fleck" may form on the work piece, and one or more of the cutting tools utilized in the foregoing slot milling sequences 200,900 may be configured to remove this smearing or "black fleck." This smearing or "black fleck," also known as alpha case, is an oxygen-enriched phase that occurs when Titanium and its alloys are exposed to heated air or oxygen, resulting in formation of an underlying oxygen enriched metallic layer may form on the work piece. Alpha case is hard and brittle and must be removed before components are put into service. Normal methods of removal include shot blasting and pickling, hot salt bath descaling and machining, grinding and the like.

Figure 17:
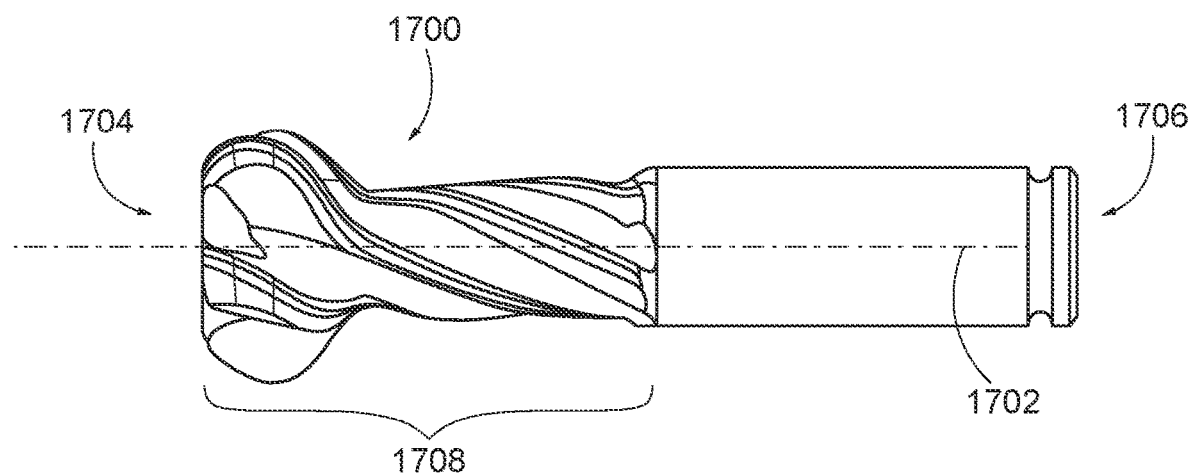
FIG. 17 is a side view of a finishing tool that may be utilized in a finishing operation of one or more of the milling sequences described herein.

FIG. 17 illustrates a side view of an exemplary tool 1700 configured to inhibit or eliminate the foregoing smearing or "black fleck." The tool 1700 includes a central axis 1702 extending from a cutting or axial face 1704 toward a shank portion 1706. The tool 1700 may be configured with a plurality of flutes that define a cutting portion 1708 of thereof that extends from the axial face 1704 towards the shank portion 1706. The shank portion 1706 may be configured to reduce pull out and control gauge length. The latter feature will help inhibit the operator from setting the wrong height and stop twisting and pulling out of the tool from the holder. In one example, the shank portion 1706 is configured with an MST Z-Lock shank to inhibit slipping and pull out.

In the illustrate embodiment, the tool 1700 includes five flutes but it may instead include more or less than five flutes. Regardless of number, the flutes may be uniformly evenly arranged about the central axis 1702 or the flutes may instead be configured with an unequal indexing. The tool 1700 also includes a plurality of peripheral cutting edges extending radially projecting from the central axis 1702 and extending helically around the central axis 1702. The cutting edges are arranged at a helix angle, and the helix angle may range between fifteen and forty-five degrees. In some embodiments, each of the cutting edges includes the same helix angle, whereas, in other embodiments, one or more of the cutting edges may include a different helix angle relative to the helix angles of one or more of the other cutting edges. In addition, the cutting edges may each be arranged at the same or different radial rake angles, where a radial rake angle is the rake angle of a peripheral cutting edge on a cross-section to the central axis 1702 of the tool 1700. The radial rake angle determines the cutting edge sharpness and strength, and may range between zero and twenty degrees. In addition, the tool 1700 may include one or more jet streams extending from the shank portion 1706 towards the axial face 1704 and, in some embodiments, extending into the cutting portion 1708. The tool 1700 may also include a central coolant hole (obscured from view) extending into and through the shank portion 1706, into the cutting portion 1708, and exiting at side exit holes (not illustrated) for providing coolant at difficult to reach areas, for example, within the flutes of the cutting portion 1708. In even other embodiments, the central coolant hole extends into an opening on the axial face 1704 (which may be larger or smaller than the side exit holes) and, as detailed below, this opening on the axial face 1704 that is in communication with the central coolant hole is added during the conversion process.

As mentioned, the cutting portion 1708 includes a number of cutting edges. The cutting edges have peripheral portions as illustrated in the side view of FIG. 17. The cutting edges also extend onto the axial face 1704 of the tool 1700 and thus include axial portions. In addition, the axial face 1704 of the tool 1700 may be configured to inhibit or eliminate the foregoing smearing or "black fleck."

Figure 18:
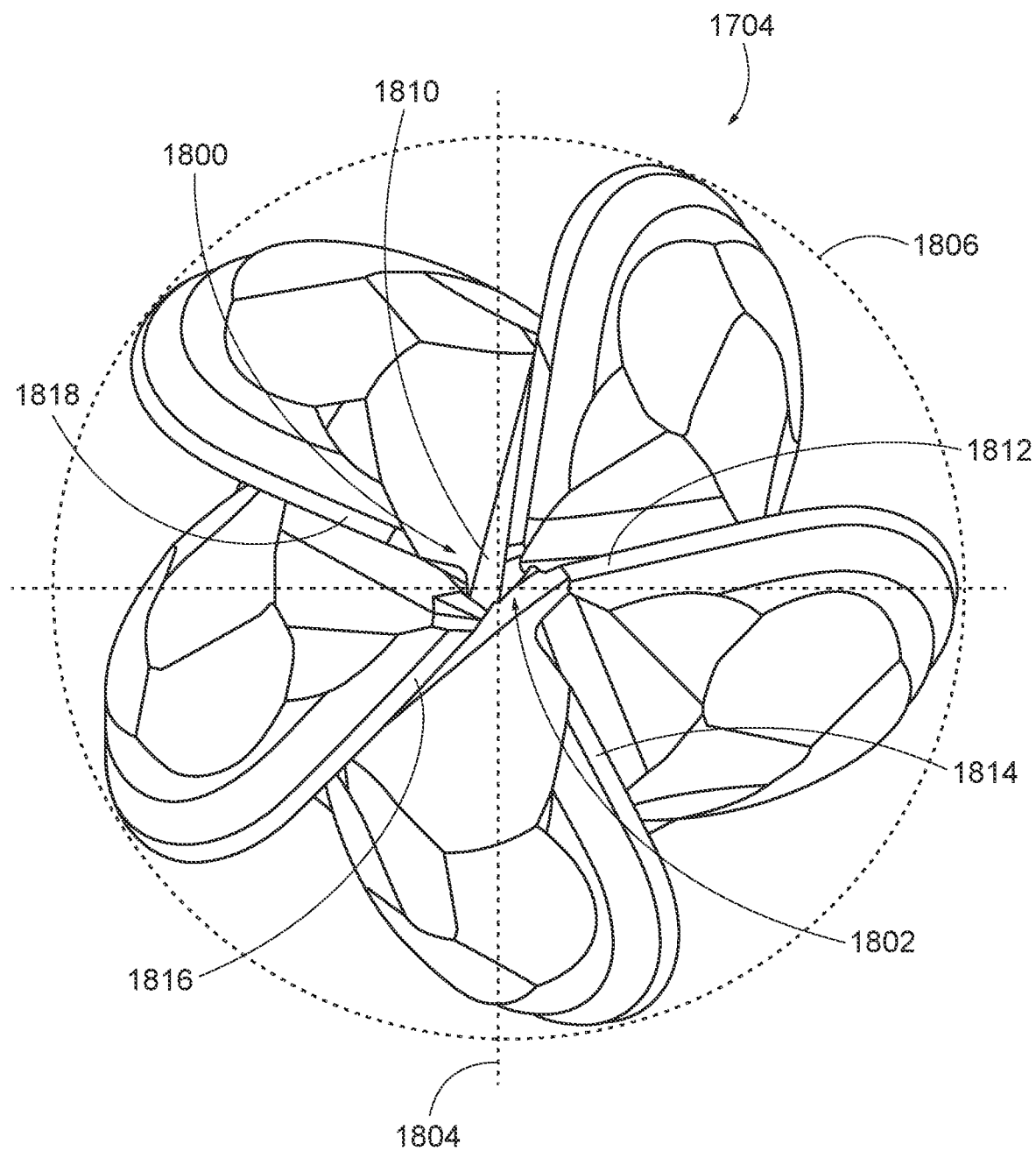
FIG. 18 is a top view of the finishing tool of FIG. 17.
Figure 19:
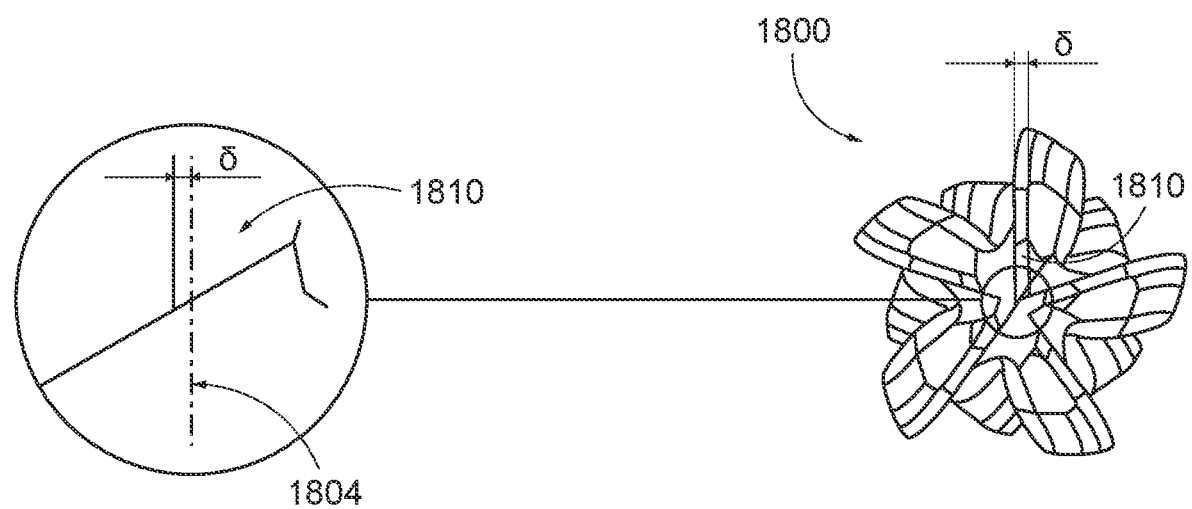
FIG. 19 is a top view of the finishing tool of FIG. 17.

FIGS. 18 and 19 are top views of the tool 1700 of FIG. 17, according to one or more embodiments. In particular, FIG. 18 illustrates the axial face 1704 of the tool 1700 configured with a tooth over center feature 1800. The tooth over center feature 1800 inhibits or eliminates the foregoing smearing or "black fleck," and otherwise helps reduce tram lines down the center of the slot. Thus, the tool 1700 may be utilized in any of the above described operations (i.e., of either of the slot milling sequences 200,900) to eliminate smearing or "black fleck." In addition, the tool 1700 may include a through hole with side exit hole or side Jetstream slots to deliver coolant into difficult to reach areas.

When evaluating a top view of the tool 1700 as shown in FIGS. 18 and 19, the central axis 1702 defines a center point 1802. In addition, a plane extending through the central axis 1702 is illustrated in FIGS. 18 and 19 as a center line 1804. As illustrated, each of the cutting edges extends onto the axial face 1704 of the tool 1700, from a periphery 1806 of the tool 1700 towards the center point 1802. In this manner, each of the cutting edges defines a tooth on the axial face 1704 of the tool 1700. Various number of teeth may be provided on the axial face 1704 depending on the number of flutes and cutting edges. In the illustrated embodiment, the tool 1700 includes five teeth 1810,1812,1814,1816,1818. However, more or less than five teeth may be provided.

As mentioned above, the tool 1700 may be configured with a tooth over center feature 1800. Accordingly, one of the teeth 1810,1812,1814,1816,1818 may extend inward from the periphery 1806 of the tool 1700 (towards the center point 1802 and) beyond the center point 1802. Here, the first tooth 1810 extends inward from the periphery 1806, in a direction towards the center point 1802, beyond the center line 1804 a distance □. Accordingly, the tool 1700 may be configured to be a center cutting tool in that at least one of the teeth 1810,1812,1814,1816,1818 extends beyond the center line 1804 such that a cutting element is provided at the center point 1802. The remaining teeth 1812,1814,1816, 1818 extend inward towards the center point 1802, but end a distance from the center point 1802. In some embodiments, each of the teeth 1812,1814,1816,1818 are equally off-set from the center point 1802 and thus end the same distance from the center point 1802. In the illustrated embodiment, however, the teeth 1812,1814,1816,1818 may be off-set from the center point 1802 at different distances and thus all end at variable distances from the center point 1802. For example, the remaining teeth 1812,1814,1816, 1818 are each off-set from the center point 1802 at varying distances, with the second tooth 1812 being closer in distance to the center point 1802 than the third tooth 1814, the third tooth 1814 being closer in distance to the center point 1802 than the fourth tooth 1816, and the fourth tooth 1816 being closer in distance to the center point 1802 than the fifth tooth 1818. In other embodiments, the remaining teeth 1812,1814,1816,1818 may each be distanced from the center point 1802 at different distances, or the remaining teeth 1812,1814,1816,1818 may be equally off-set from the center point 1802 at equal distances.

Bulb slots disclosed herein may be formed with a suite of different form tools, such as bulb tools, and these form tools may be staged or converted into new form tools utilized in other operations. More specifically, a form rougher, a form semi-finish, and a form finisher tool may all be utilized in sequence during a machining process, and the form finisher tool may be converted to the form semi-finisher tool and/or to the form rougher tool. For example, the finishing tool utilized in a finishing operation (e.g., in the fifth operation (Op5) of sequence 200 or the sixth operation (Op6) of sequence 900) may be converted into the semi-finishing tool utilized in a semi-finishing operation (e.g., in the fourth operation (Op4) of sequence 200 or the fifth operation (Op5) of sequence 900) after performing a number of finishing operations; and then that converted semi-finishing tool may be converted into the form roughing tool utilized in a roughening operation after performing a number of semi-finishing operations. This staging or conversion of tools may be performed by grinding and resizing the tools as hereinafter described. Converting tools in this manner will result in significant cost savings, and amortized costs will be massively reduced by converting and regrinding. Moreover, converting tools in this manner may reduce lead time to the customer.

The various form tools utilized to form bulb slots have different geometries and cutting features. In one or more embodiments, the tool 1700 with the over center feature 1800 is a finishing tool that may be utilized in finishing operations, for example, such as the fifth operation (Op5) of the slot milling sequence 200 of FIG. 2 or the sixth operation (Op6) of the slot milling sequence 900 of FIG. 9. Here, the tool 1700 configured as a finishing tool is the largest of the tools (i.e., larger than the form semi-finisher tool and the form rougher tool) and configured to produce the slot 1000 within a form tolerance of about a +/−0.010 mm. This finishing tool may have a non-honed cutting edge. As mentioned, the tool 1700 may be converted from the form finishing tool to a form semi-finishing tool after performing a number of finishing operations. Here, the tool 1700 configured as a semi-finisher tool is smaller in diameter than the finishing tool by about 0.5 to 2.5 mm, and in some embodiments, the semi-finisher tool is smaller in diameter by about 0.05 to 1.5 mm or by about 1 to 1.5 mm. Also here, the form of the semi-finisher tool may be off-set from a final form surface of the slot by approximately 0.15 mm during each pass of the semi-finishing operation. In one embodiment, the semi-finisher tool has a diameter that has been reduced by about 1.5 mm. The semi-finisher tool may have a honed edge, for example, a variable edge hone between 0.005 and 0.020 mm. Also, the tool 1700 configured as a semi-finisher tool need not include the tooth over center feature 1800. After being converted to a form semi-finishing tool and performing a number of semi-finishing operations, the tool 1700 may then be configured to be converted into a form roughing tool. Here, the tool 1700 configured as a rougher tool is smaller in diameter than the semi-finishing tool by about 0.5 to 1.5 mm, and the form may be off-set from the finished surface of the slot subsequently formed (i.e., in the prior operation) by approximately 0.6 mm during each pass of the roughening operation. In one embodiment, the rougher tool has a diameter that is reduced by about 1.5 mm. By offsetting the semi-finisher tool and the rougher tool in this manner described above, sufficient material is removed within the form slot during the respective roughing and semi-finishing operations such that later operations are not overloaded with too much material to remove that may overload subsequent tools and impact consistency and deviation from final form. For example, offsetting as described above leaves less material on for the finishing operation (i.e., 0.15 mm) so there is less load on the finishing tool and it will hold a more consistent size. Leaving more on after the roughing operation (0.6 mm) creates more load and potentially risk of deviating from final form.

The roughing tool may have chip breaker features on the cutting edge, as well as a honed edge, for example, a variable edge hone between 0.005 and 0.020 mm. Addition of the chip breaker features to the roughing tool may help the operator identify which tool the tool 1700 has been converted into (e.g., whether the tool is a finisher with tooth over center, semi-finisher without tooth over center, or a rougher with chip breakers and without tooth over center). Also, the various tool diameters may also help differentiate the configuration of the tool 1700. Addition of the chip breaker features may further reduce load during the roughing process. Also, the chip breakers may help reduce the swarth (chip) size and aid chip evacuation, which may enhance tool efficiency as re-cutting the chips risks chipping the tool, reducing tool life, and/or damaging the component.

Even further, the tool 1700, regardless of whether configured as a finisher, semi-finisher, or rougher, may have a coating. The coating may be applied via any number of processes, for example a physical vapor deposition ("PVD") process. Various types of coating may be utilized. For example, the tool 1700, regardless of its configuration, may include a Titanium Aluminum Silicon Nitride (TiAlSiN) PVD coating or an Aluminum Titanium Chromium Nitride (AlTiCrN) PVD coating.

Thus, methods for converting tools are also disclosed herein. For example, a method may include the steps of providing the tool 1700 having the over center feature 1800, performing one or more finishing operations, and then converting the tool 1700 to either a semi-finishing tool or a roughing tool.

Converting the tool 1700 into a semi-finishing tool may include a number of steps. For example, after performing one or more finishing operations, converting the tool 1700 into a semi-finishing tool may include grinding the over center feature 1800 such that the first tooth 1810 is removed and grinding the tool to reduce diameter. Where the tool 1700 is being converted from a finishing tool to the semi-finishing tool, the diameter may be ground by about 0.5 mm or more and, in one embodiment, the diameter is ground by about 1.5 mm. In addition, converting the tool 1700 into a semi-finishing tool may include grinding the remaining teeth 1812,1814,1816,1818. Here, the remaining teeth 1812,1814, 1816,1818 may each be ground such that they are all equally off-set from the center point 1802 (i.e., at equal distances) or such that at least one of the remaining teeth 1812,1814, 1816,1818 is off-set at a different distance from the center point 1802 as compared to the others of the remaining teeth 1812,1814,1816,1818 (i.e., at varied distances). In addition, converting the tool 1700 into a semi-finishing tool may include the step of creating a central coolant hole exiting at the axial face 1704, for example, using electrical discharge machining to form a coolant hole that extends through the tool 1700 along the central axis 1702 and opens at the center point 1802. In some embodiments, the central coolant hole is smaller than the central through hole connected to the side holes, such that the pressure of coolant exiting the side holes is increased. Moreover, the step of converting the tool 1700 into a semi-finishing tool may include honing the cutting edges. The cutting edges may be honed to have uniform edge hone or a variable edge hone, for example, between 0.005 and 0.020 mm. Also, the step of converting the tool 1700 into a semi-finishing tool may include coating the tool 1700.

Converting the tool 1700 into a roughing tool may include a number of steps. Where the tool 1700 is being converted from the finishing tool into the roughing tool, after performing one or more finishing operations, converting the tool 1700 into a roughing tool may include grinding the over center feature 1800 such that the first tooth 1810 is removed and grinding the tool to reduce tool diameter. Here, the diameter may be ground by about 2.0 mm or more and, in one embodiment, the diameter is ground by about 3.0 mm. In addition, converting the tool 1700 into a roughing tool may include grinding the remaining teeth 1812,1814,1816, 1818. Here, the remaining teeth 1812,1814,1816,1818 may each be ground such that they are all equally off-set from the center point 1802 (i.e., at equal distances) or such that at least one of the remaining teeth 1812,1814,1816,1818 is off-set at a different distance from the center point 1802 as compared to the others of the remaining teeth 1812,1814, 1816,1818 (i.e., at varied distances). Where the tool 1700 is being converted from the semi-finishing tool into the roughing tool, after performing one or more semi-finishing operations, converting the tool 1700 into a roughing tool may include the step of grinding the tool to reduce diameter. Here, the diameter may be ground by about 1.5 mm. Also, the teeth 1810,1812,1814,1816,1818 may be further ground to increase any or all of their distances from the center point 1802.

The step of converting the tool 1700 into a roughing tool, regardless of whether being converted from a finishing tool or semi-finishing tool, may also include the step of grinding chip breaker features on the cutting edges. Also, the step of converting the tool 1700 into a roughing tool may include honing the cutting edges. The cutting edges may have uniform edge hone or a variable edge hone, for example, between 0.005 and 0.020 mm. In addition, the step of converting the tool 1700 into a roughing tool may include creating a central coolant hole exiting at the axial face 1704 if not already provided. Where the central coolant hole has previously been provided, for example, when converting the finishing tool to the semi-finishing tool, this central coolant hole may be expanded during the step of converting the tool 1700 into a roughing tool. Moreover, the step of converting the tool 1700 into a roughing tool may include coating the tool 1700.

Prior to performing a finishing, a semi-finishing, or a roughening operation with the form tool 1700, a probing step may be performed to ensure that the proper converted tool will be used for the particular operation. For example, a laser probe may be utilized determine whether the tool 1700 is the finisher tool, the semi-finisher tool, or the rougher tool. In particular, the laser probe may measure the tool diameter of the tool 1700 and that measurement may be compared to reference data that includes the minimum tool dimensions of the finisher, semi-finisher, and rougher tools to determine which tool is being probed. In one example, the difference between the minimum diameter of the finisher tool and the maximum diameter of the semi-finisher tool incorporates a safety factor gap of about 0.5 mm; and the difference between the minimum diameter of the semi-finisher tool and the maximum diameter of the rougher tool incorporates a safety factor gap of about 0.5 mm.

As used herein, the terms "about" and "approximately" mean plus or minus 15% of the numerical value of the number with which it is being used. Therefore, "about 40" (or "approximately 40") means "in the range of 34 to 46." It is also noted that the terms "generally" and "substantially" may be used herein to represent the inherent degree of uncertainty that may be attributed to any quantitative comparison, value, measurement, or other representation. These terms are also used herein to represent the degree by which a quantitative representation may vary from a stated reference without resulting in a change in the basic function of the subject matter at issue.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The invention claimed is:

1. A method of roughing a bulb slot in a work piece, the method comprising:
    roughing a slot in the work piece;
    roughing upper angle portions in the slot with a first rougher tool fed through the work piece along a first tool path tilted in a first orientation and along a second tool path tilted in a second orientation;
    roughing lower angle portions in the slot;
    roughing a bulb form in the upper angle portions and the lower angle portions of the slot.

2. The method of claim 1, wherein the step of roughing a slot in the disc is performed via the first rougher tool that is fed through the work piece along a trochoidal tool path.

3. The method of claim 1, wherein the step of roughing lower angle portions in the slot is performed via the first rougher tool that is fed through the work piece along a third and fourth tool path, wherein a first of the lower angle portions is formed via the third tool path and a second of the lower angle portions is formed via the fourth tool path.

4. The method of claim 1, further comprising semi-finishing the bulb form.

5. The method of claim 4, further comprising finishing the bulb form to complete the bulb slot.

6. The method of claim 5, wherein the step of finishing the bulb form to form the bulb slot is performed via a finishing tool, the finishing tool comprising:
- a plurality of flutes helically extending along a cutting portion, each of the flutes defining a cutting edge; and
- a plurality of teeth arranged on a cutting face of the finishing tool, each of the teeth extending from one of cutting edges, at least one of the plurality of teeth extending over a centerline of the cutting face.

7. The method of claim 6, wherein a remaining set of the plurality of teeth do not extend over the centerline of the cutting face.

8. The method of claim 7, wherein each of the remaining set of the plurality of teeth are spaced at equal distances from a center point of the cutting face.

9. The method of claim 7, wherein at least two of the remaining set of the plurality of teeth are spaced at unequal distances from a center point of the cutting face.

10. The method of claim 6, wherein the finishing tool includes a central channel that extends through the finishing tool and opens at least one side hole provided on at least one of the flutes.

11. A method of machining a bulb slot in a work piece, the method comprising:
- roughing a slot in the work piece;
- roughing upper angle portions in the slot;
- roughing lower angle portions in the slot;
- roughing a bulb form in the upper angle portions and the lower angle portions of the slot;
- wherein,
- the step of roughing lower angle portions in the slot is performed via a first rougher tool that is fed through the work piece along a first lower and second lower tool path, wherein a first of the lower angle portions is formed via the first tool path where the first rougher tool is tilted in a first orientation and a second of the lower angle portions is formed via the second tool path where the first rougher tool is tilted in a second orientation.

12. The method of claim 6, wherein the step of roughing a slot in the work piece is performed via the first rougher tool.

13. The method of claim 11, further comprising semi-finishing the bulb form, wherein the step of semi-finishing the bulb form is performed via a semi-finishing tool, wherein the semi-finishing tool is formed from a finishing tool by removing the at least one of the plurality of teeth that extends over the centerline of the cutting face.

14. The method of claim 13, wherein the semi-finishing tool includes a plurality of cutting edges that helically extend about a cutting portion of the semi-finishing tool and each extend into one of the plurality of teeth on the cutting face, the cutting portion defining a diameter that is smaller than the finishing tool.

15. The method of claim 13, wherein the semi-finishing tool includes a central channel that extends through the semi-finishing tool and opens at a hole provided on the cutting face.

16. The method of claim 13 wherein each of the cutting edges includes a variable edge hone.

17. The method of claim 13, wherein the step of roughing the bulb form in the upper angle portions and the lower angle portions of the slot is performed via a form rougher tool, wherein the semi-finishing tool is modified by reducing a diameter of the semi-finishing tool to form the form rougher tool.

18. The method of claim 17, wherein a plurality of chip breaker notches are provided into the cutting edges.

19. The method of claim 11, wherein the step of roughing upper angle portions in the slot is performed via the first rougher tool that is fed through the work piece along a first upper and second upper tool path, wherein a first of the upper angle portions is formed via the first upper tool path where the first rougher tool is tilted in a first orientation and a second of the upper angle portions is formed via the second upper tool path where the first rougher tool is tilted in a second orientation.

* * * * *